US006723233B1

(12) United States Patent
Barnes

(10) Patent No.: US 6,723,233 B1
(45) Date of Patent: Apr. 20, 2004

(54) OZONE GENERATOR RETROFIT APPARATUS FOR JETTED TUBS AND SPAS

(76) Inventor: Ronald L. Barnes, #74 Revere Way, Hunstville, AL (US) 35801

( * ) Notice: Subject to any disclaimer, the term of this patent is extended or adjusted under 35 U.S.C. 154(b) by 0 days.

(21) Appl. No.: 10/061,752

(22) Filed: Feb. 1, 2002

Related U.S. Application Data

(63) Continuation-in-part of application No. 09/752,982, filed on Dec. 31, 2000, now Pat. No. 6,623,635, which is a continuation-in-part of application No. 09/418,915, filed on Oct. 15, 1999, now Pat. No. 6,342,154, application No. 10/061,752, which is a continuation-in-part of application No. 09/794,601, filed on Feb. 27, 2001, now abandoned, which is a continuation-in-part of application No. 09/752,982, and a continuation-in-part of application No. 09/393,437, filed on Sep. 10, 1999, now Pat. No. 6,192,911, application No. 10/061,752, which is a continuation-in-part of application No. 09/717,904, filed on Nov. 20, 2000, now Pat. No. 6,426,053, and a continuation-in-part of application No. 09/520,504, filed on Mar. 8, 2000, now Pat. No. 6,405,387.

(51) Int. Cl.[7] .............................. A61H 33/14; C02F 1/78
(52) U.S. Cl. .................... 210/167; 210/192; 210/198.1; 210/416.1; 4/541.1; 261/121.1
(58) Field of Search ................................. 210/136, 138, 210/169, 192, 198.1, 220, 416.1, 760, 167; 4/492, 541.1, 541.2; 261/121.1

(56) References Cited

U.S. PATENT DOCUMENTS

| 3,996,136 A | | 12/1976 | Jakubek et al. | |
|---|---|---|---|---|
| 4,043,913 A | | 8/1977 | Hintermeister | 4/541.1 X |
| 4,169,293 A | | 10/1979 | Weaver | 4/541.2 |
| 4,640,783 A | | 2/1987 | Kern | 4/490 X |
| 4,688,699 A | | 8/1987 | Goudy, Jr. et al. | |
| 4,761,838 A | * | 8/1988 | Hargrove | 4/541.2 |
| 4,797,958 A | | 1/1989 | Guzzini | 4/541.2 |
| 4,829,607 A | | 5/1989 | Huse | 4/541.1 |
| 5,012,535 A | | 5/1991 | Klotzbach | 4/541.2 |
| 5,032,292 A | * | 7/1991 | Conrad | 210/764 |
| 5,056,168 A | * | 10/1991 | Mersmann | 4/541.6 |
| 5,075,016 A | | 12/1991 | Barnes | |
| 5,082,558 A | | 1/1992 | Burris | |
| 5,207,993 A | | 5/1993 | Burris | |
| 5,213,773 A | | 5/1993 | Burris | |
| 5,376,265 A | | 12/1994 | Szabo | |
| 5,665,228 A | | 9/1997 | Leaverton | |
| 5,888,389 A | | 3/1999 | Griffith | |
| 5,989,439 A | | 11/1999 | Persinger | |
| 6,096,221 A | | 8/2000 | Kerchouche | |
| 6,129,850 A | * | 10/2000 | Martin et al. | 210/760 |
| 6,146,524 A | | 11/2000 | Story | |
| 6,274,052 B1 | * | 8/2001 | Hartwig | 210/760 |
| 6,279,177 B1 | | 8/2001 | Gloodt | 4/541.1 |
| 6,357,060 B2 | * | 3/2002 | Gloodt | 4/541.1 |
| 6,405,387 B1 | * | 6/2002 | Barnes | 4/541.2 |
| 6,523,192 B1 | * | 2/2003 | Gloodt | 4/541.1 |
| 6,551,519 B1 | * | 4/2003 | Hartwig | 210/760 |

FOREIGN PATENT DOCUMENTS

| DE | 4231334 | 4/1993 | 4/541.1 |
|---|---|---|---|
| JP | 3158163 | 7/1991 | 4/541.1 |

* cited by examiner

Primary Examiner—Fred G. Prince
(74) Attorney, Agent, or Firm—Mark Clodfelter

(57) ABSTRACT

Retrofit apparatus for retrofitting an ozone generator to a spa, hot tub or similar facility is disclosed. Here, a fitting is threaded into an air inlet of a spa or hot tub, and covers provided for the water outlets to generally prevent outgassing. In another embodiment, an ozone-providing plug is provided to one water outlet of a spa or hot tub, with the air and other outlets being blocked. In addition, different configurations of ozone generator are disclosed. Particularly, one type ozone generator includes an inverted U-shaped apparatus so that heat from the ozone generator induces a chimney effect so as to cause the ozonated air to rise through a chimney and then settle into a selected area. Another ozone generator creates a low rate of airflow by "ion wind" in order to propel ozonated air into a system of piping in the absence of water flowing therethrough.

33 Claims, 13 Drawing Sheets

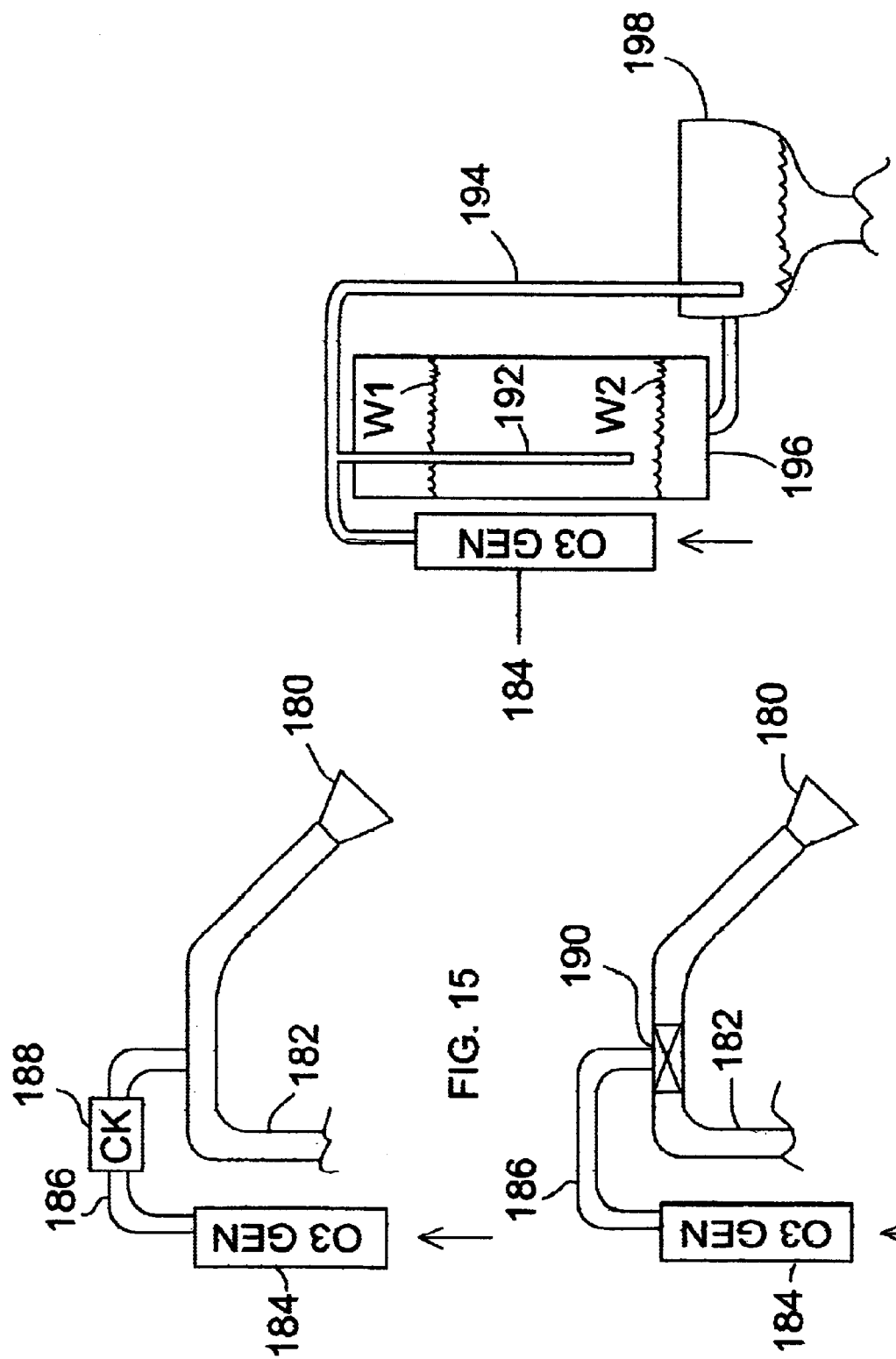

OZONE GENERATOR RETROFIT APPARATUS FOR JETTED TUBS AND SPAS

CROSS REFERENCE TO RELATED APPLICATIONS

This application is a continuation-in-part of Applicant's patent application Ser. No. 09/752,982, filed Dec. 31, 2000, now U.S. Pat. No. 6,623,635 which is a continuation-in-part of Applicant's patent application Ser. No. 09/418,915, filed Oct. 15, 1999, now U.S. Pat. No. 6,342,154. Also, this application is a continuation-in-part of Applicant's copending application Ser. No. 09/794,601, filed Feb. 27, 2001, now abandoned, and which is also a continuation-in-part of patent application Ser. No. 09/752,982, filed Dec. 31, 2000, now U.S. Pat. No. 6,623,635 and a continuation-in-part of Applicant's application Ser. No. 09/393,437, filed Sep. 10, 1999, now U.S. Pat. No. 6,192,911. In addition, this application is a continuation-in-part of patent application Ser. No. 09/520,504, filed Mar. 08, 2000, now U.S. Pat. No. 6,405, 387, and a continuation-in-part of Applicant's patent application Ser. No. 09/717,904, filed Nov. 20, 2000, now U.S. Pat No. 6,426,053.

FIELD OF THE INVENTION

This invention relates to retrofitting hot tubs, spas, jetted bathtubs and the like with an ozone generator communicating with water and air conveying tubes of the tub for injecting ozone into these tubes. Particularly, the ozone generator may be operated in at least two modes wherein low flow/high concentration of ozone is provided in the absence of water and high flow low concentration is provided when the tub is in use.

BACKGROUND OF THE INVENTION

Hot tubs, spas and whirlpool bathtubs, in addition to whirlpool baths such as those found in hospitals, nursing homes and rehabilitation facilities, all circulate water between a water intake and jets positioned under the water level of the tub, spa or bath. In most instances, air from an adjustable air valve is mixed with the water to increase impingement thereof on the body and skin of the user to promote muscle relaxation.

In the case of spas and hot tubs, water is generally kept in the tub for a longer period of time. This water should be changed relatively frequently, typically once a month or so. A sanitizer such as chlorine or bromine is used in a manner similar to sanitizer use in a pool, and the ph (level of acidity/alkalinity) is kept within a selected range. Where chlorine is used as a sanitizer, the level is generally maintained from about 1–3 parts per million, and should not be allowed to fluctuate. This level is sufficient to kill most bacteria and at least inhibit growth of other microbiota. However, this standard level of sanitizer will not fully prevent growth of algae, fungi and some protozoan lifeforms, such as amoebae, which may harbor colonies of organisms that cause Legionnaires disease.

In order to fully sterilize these tubs and spas, it is recommended that the water be "shocked", or the sanitizer level raised to a level, typically 8–15 parts per million of chlorine, sufficient to kill all microbiota in the water just prior to draining the tub or spa for refilling. The pump of the spa is operated for a sufficient period of time in order to allow the shocked water to circulate through all the pipes and tubes thereof, sterilizing all water-contacting surfaces of the spa. The shocked water, which contains contaminants such as chloramines, is then drained, and the sanitized tub or spa is then refilled with fresh water, the ph adjusted and sanitizer added. In the case of a jetted or whirlpool bathtub the water is simply drained after each use and refilled just prior to each use.

Problems with hot tubs and spas and other jetted bathing tubs or receptacles wherein water is kept therein over a period of time and reused is that if sanitizer levels are allowed to fluctuate then all manner of amoebas, bacteria, fungi, viruses, algae and other microbiota thrive on organic compounds present in the water. Harmful species of bacteria may also grow, such as listeria monocytogenes, which can cause pneumonia, meningitis and septisemia, and pseudomonas aeruginosa, which is responsible for pneumonia and skin rashes. While various strains of listeria may be eliminated by sanitizers and use of disinfectants, pseudomonas aeruginosa is a particularly resistant organism that defies most common sanitizers and antibiotics, and can grow at temperatures up to 42 degrees Celsius. Pseudomonas prefers moist and humid environments, and can survive even in distilled water. Worse yet, *Legionella pneumophilia,* the bacteria responsible for Legionnnaires disease, colonizes in amoebas that thrive in spas, hot tubs and jetted tubs, as well as showers, air conditioning evaporative cooling towers and other constantly wet or humid places. It is estimated that Legionnaires disease affects between 10,000–20,000 people per year, with a fatality rate of 5%–15% or more. Thousands more are probably infected, but are not severely sickened by the disease, developing only minor illness from the infections.

In addition to the foregoing, it is generally impossible to physically clean the interior of water and air-conveying tubes of the tub or spa as with the exposed surfaces thereof. As such, a "bioslime" of algae, fungus and a variety of bacteria colonies builds up on these interior surfaces of the tubes that is not removed by shocking the water and is not penetrated by sanitizer.

Accordingly, there is a need to better sanitize hot tubs, spas, and all manner of jetted tubs to eliminate the above mentioned and other diseasecausing organisms that live and grow in the water and air-carrying tubes of these tubs and spas. It is another object of the invention to oxidize and remove bioslime and other organic contaminants in the water and air-conveying tubes of jetted tubs and spas that are not removed by providing ozone only to the water. It is yet another object of the invention to provide apparatus for retrofitting jetted tubs and spas with an ozone generator communicating with water and air-carrying tubes of the system. Additional objects of the inventions will become clear upon a reading of the following specification.

SUMMARY OF THE INVENTION

A spa, hot tub or other similar jetted tub having a water and air circulation system is retrofitted with an ozone generator capable of providing different flow rates and concentrations of ozone.

BRIEF DESCRIPTIONS OF THE DRAWINGS

FIGS. 15–16 diagrammatically illustrate an ozone generator in combination with a showerhead and associated plumbing.

FIG. 17 is a diagrammatic illustration of a toilet tank and associated bowl with an ozone generator providing ozone to both the tank and bowl.

Figure 18:
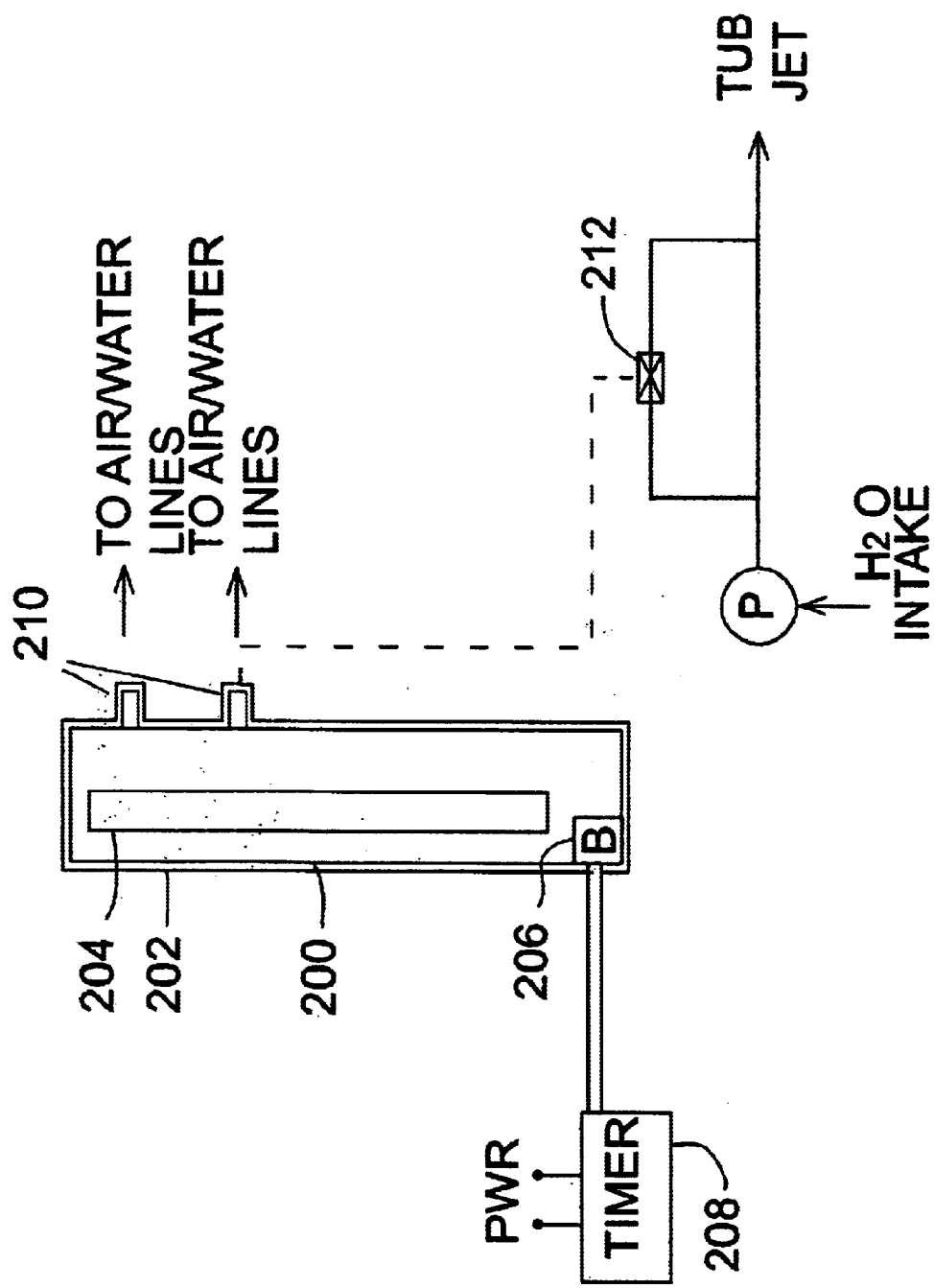

FIG. 18 is a diagrammatic illustration of an ozone generator coupled to an intake and at least one jet output of a jetted tub or spa.

Figure 19:
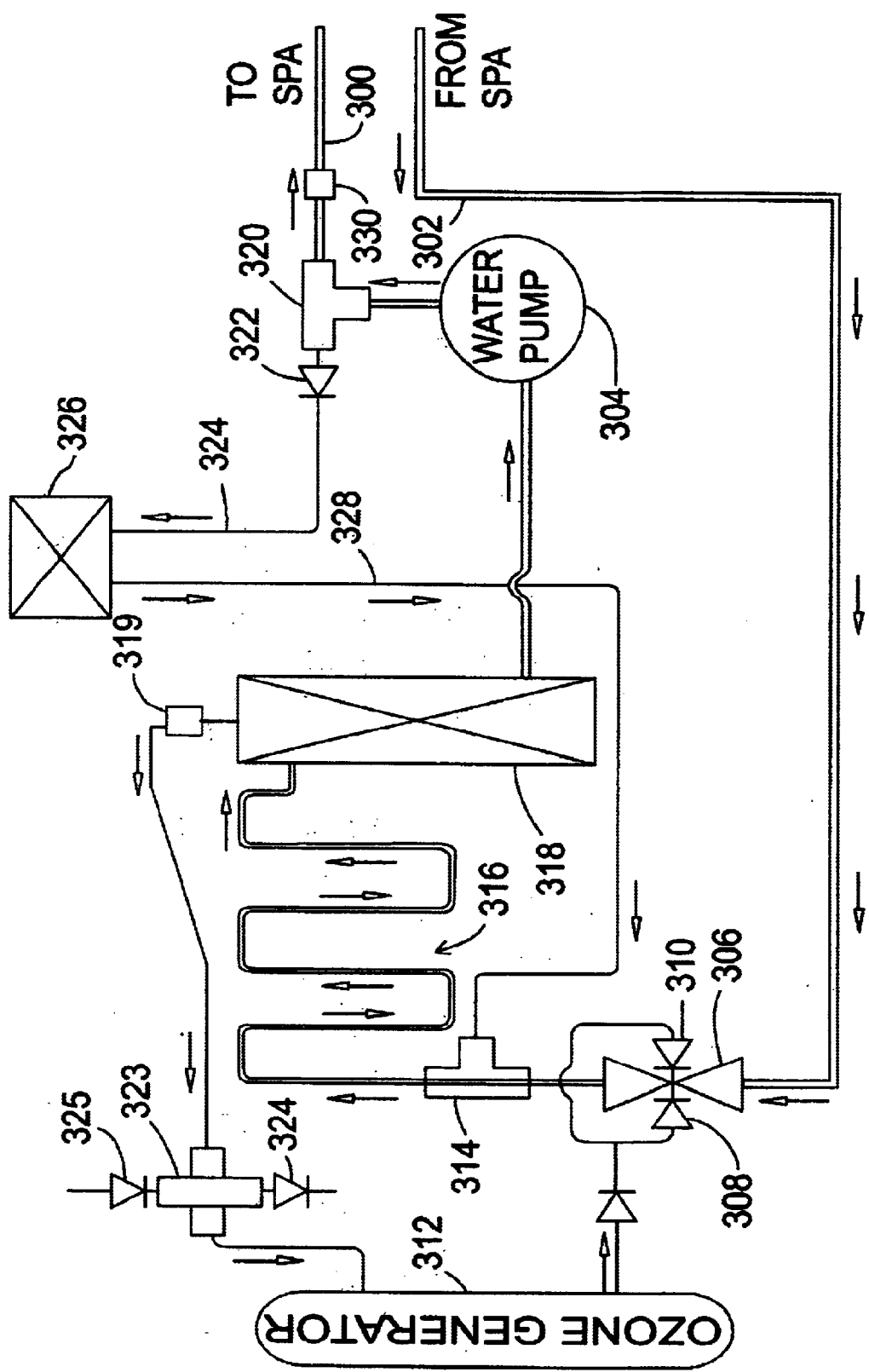

FIG. 19 is a schematic illustration of a stand-alone sanitizing system for a spa, hot tub, jetted tub or other similar recreational facility.

Figure 20:
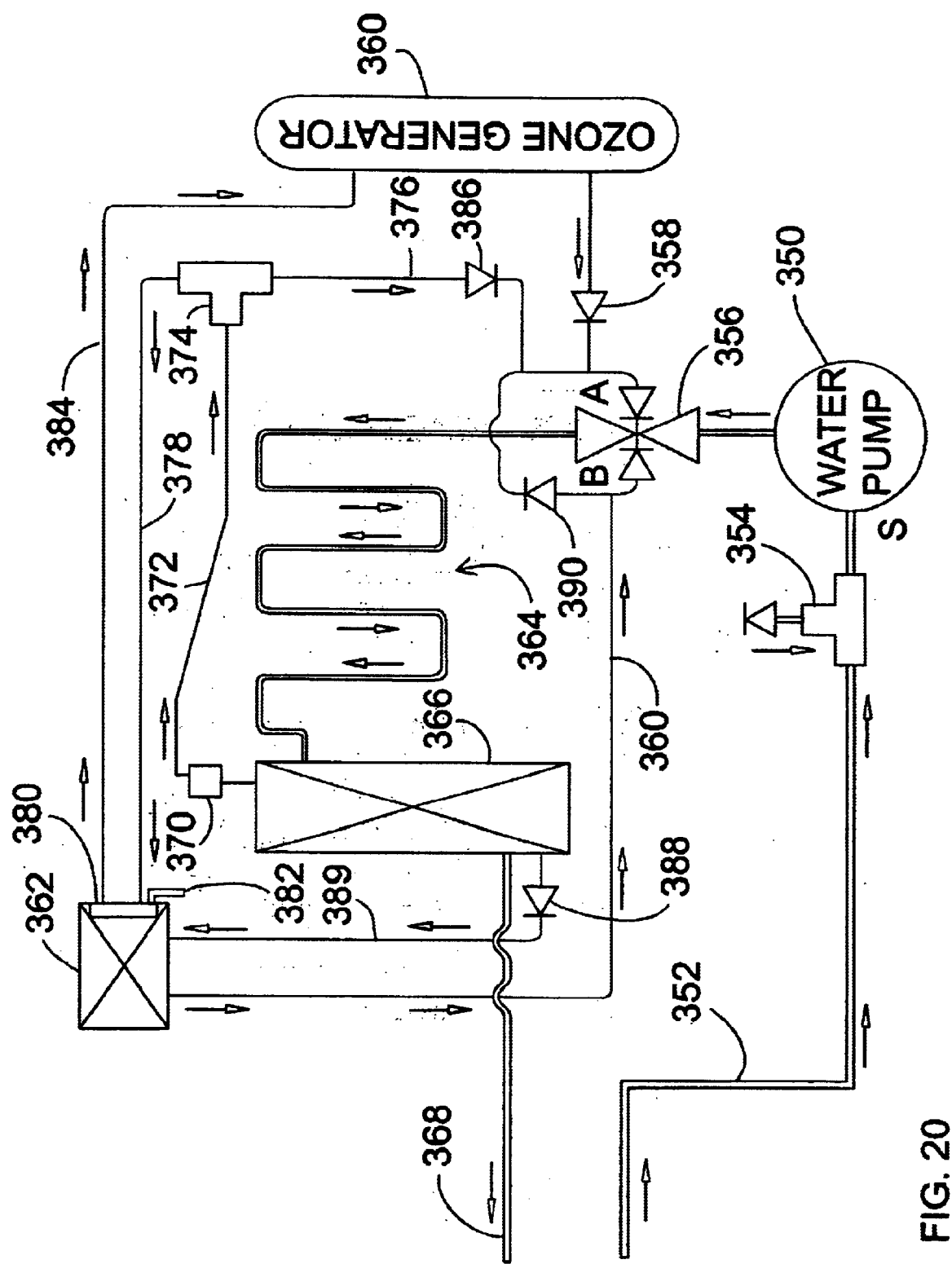

FIG. 20 is a schematic illustration similar to FIG. 19 of another embodiment of a stand-alone sanitizing system.

DETAILED DESCRIPTION OF THE DRAWINGS

Figure 1:
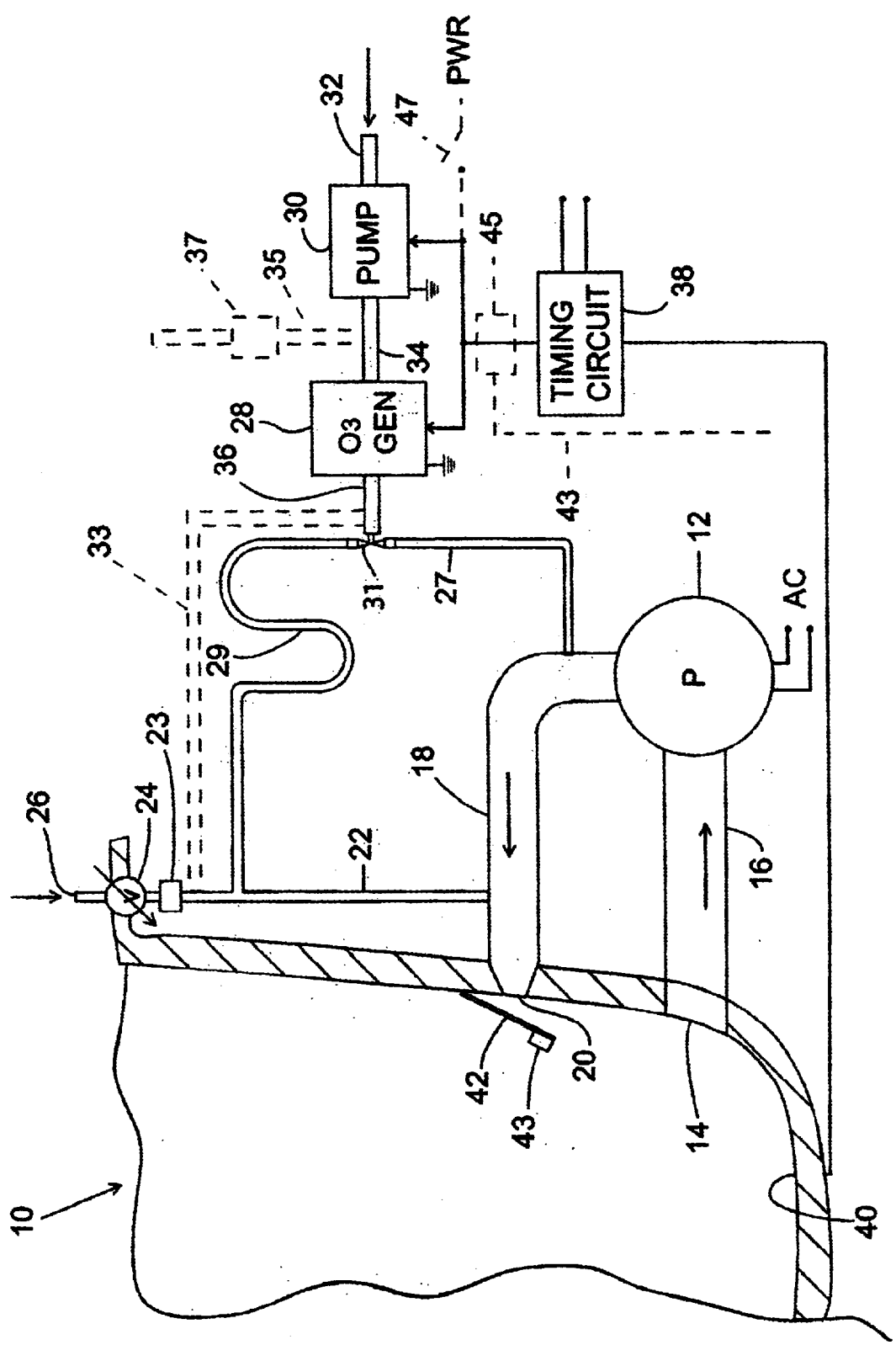
FIG. 1 is a schematic drawing of one embodiment of the invention.

Referring, by way of example, to FIG. 1, a broken-away portion of a hot tub, spa or jetted tub 10 is shown. Conventionally, a water pump and motor combination 12, hereinafter denoted as pump 12, draws water through an intake 14 from tub 10 through a tube or pipe 16 and provides relatively high pressure water via tube or pipe 18 to a jet 20. The water exits jet 20 in a high velocity stream and impinges on the user. In most instances, an air tube 22 communicates between tube 18 and an adjustable air valve 24 provided with an air intake 26. With this construction, valve 24 is adjustable to vary a quantity of air drawn by venturi principles into the high pressure stream of water exiting jet 20. While only one jet 20 is shown, it is to be understood that the majority of all such tubs are equipped with a plurality of jets and associated, circuitously routed tubes or pipes 18 from pump 12, and at least 1 water intake 14 communicating with one or more jets. Significantly, as some spas and tubs may have "dead legs" that basically are selectively switched water paths selectable by a user and which may be infrequently used, providing ozone to the air intake tubes 22, or in some businesses to the jets, ensures that these dead legs are provided with ozone on a regular basis and thus are free of bioslime and associated disease-causing bacteria. Also, it should be noted that with water flowing through plumbing of the tub, a negative pressure will exist in tube 22 that tends to draw air thereinto. Thus, providing ozone to tube 22 when the tub is in use provides ozone to the water circulating through all the jets.

In a large spa or hot tub, a water pump generally has at least a low and high speed setting (or multiple pumps), with adjustable air vents that allow variable amounts of air to be selectively drawn into some or all of the jets. In contrast, the pump for a jetted tub typically has only speed setting with adjustable air vents as described for spas.

For oxidizing and eliminating bioslime that forms on the interior of tubes 16, 18 and 22 as well as interior water-contacting surfaces of pump 12 and other interior surfaces not accessible for cleaning, Applicant proposes use of an ozone generator 28, which may be of the type that uses photodisassociation to break diatomic atmospheric oxygen ($O_2$). apart whereupon each atomic oxygen atom combines with a diatomic oxygen molecule to form ozone ($O_3$). Such an ozone generator may utilize an ultraviolet discharge tube of from about 10 watts up to about 40 or 50 watts or so with a length of about 8 inches to about 32 inches respectively, and emits ultraviolet light including a wavelength of 185 nanometers, which is known to break diatomic oxygen into monatomic oxygen. This lamp is similar to a fluorescent lamp tube, and may produce from about 50 mg to about 500 mg per hour of ozone depending on airflow past the lamp tube. Here, for example, an airflow of about 5 liters per minute past the lamp tube may generate ozone at a rate of about 70 mg per hour at a concentration of about 100 PPM, while an airflow of 10 liters per minute may generate ozone in the range of about 150 milligrams per hour at a concentration of about 100 PPM. Of course, chamber design and power levels influence production rate of ozone. In the above and following examples, rates of ozone generation are based on Applicant's commercially available ozone generator design and power levels. An airflow greater than about 10 liters per minute doesn't significantly produce more ozone, but reduces concentration of the ozone that is produced. Likewise, a lower airflow generally produces less ozone, but due to the reduced airflow, the concentration of ozone in the air is increased. Alternately, a corona-type ozone generator may be employed, which generally produce more ozone than lamp-type ozone generators. As such, it is beneficial to provide ozone at different rates of flow and at different concentrations so that when the tub is in use, i.e water flowing through the water circulation system of the tub, ozone is provided at a higher flow rate and lower concentration so as to sanitize the water while minimizing outgassing, and when the tub is not in use a low to very low flow rate of air is used to develop a higher concentration of ozone in order to oxidize bioslime and clean interior surfaces of water and air carrying tubes, including wetted surfaces of the pump. In some embodiments, a lower concentration is developed in conjunction with a smaller lamp tube, on the order of 8 inches and 10–20 watts or so, at very low flow rates, on the order of ¼ to ½ liter per minute and producing about 200 PPM to minimize outgassing while allowing ozone concentrations in tubing or other receptacles to build or accumulate due to pooling of the ozone. In other embodiments, an air and ozone mixture may be continually recirculated through tubing of the tub in order to increase ozone concentrations over time.

In one instance where the ozone generator is used with a jetted tub, spa or hot tub, an air pump or compressor 30 similar to a small aquarium pump, and which pumps about 1–2 liters per minute of air through a lamp-type ozone generator of about 10 watts or so, producing a concentration of ozone of about 80–100 PPM, may be used to pump air from an intake 32 via a tube 34 to and through ozone generator 28, and a tube 36 conveys air containing ozone, referred to as ozonated air, to a mixing device 31. Device 31 may be a venturi/mixer such as is commonly found in agricultural applications where liquid concentrated fertilizer is mixed with water and subsequently sprayed or otherwise distributed to a crop, or it may simply be a T-type fitting. In the latter instance, a check valve would typically be provided in the air line from the pump to prevent water from entering the air pump. In the instance where device 31 is a venturi/mixer, ozone may be mixed with a stream of water from pump 12 so that the bubble size is very small, greatly enhancing diffusion of ozone into the water. The device 31 may also be connected in a bypass configuration as shown where some of the water from tube 18, being under pressure from pump 12, passes through a tube 27 to mixer 31 where the water is mixed with ozone, and thereafter the ozonated water flows through a contact section of tubing 29, diagrammatically shown as serpentine tubing. In a typical installation, this contact tubing would be something on the order of 3 to 8 feet or so, and allows thorough mixing and diffusing of the ozone into the water. The ozonated water then passes into tube 22 at or below air valve 24, where it is mixed with the water and air emerging from jet 20. A check valve 23 may be used to prevent any water from being expelled from valve 24, although this is unlikely since a negative pressure exists in tube 22 during use. In another embodiment, as illustrated by dashed lines 33, ozonated air may be pumped or drawn directly from ozone generator 28 to tube 22, where it is provided to the water-carrying tube 18. In the above embodiments, pump 30 may limit an amount of air drawn by venturi principles through the ozone generator in order to develop a higher concentration of ozone. As such, there may be differing flow rates of ozonated air provided to the water circulation system depending on whether the tub is in use, is idle or is in the process of being emptied or refilled with water.

Significantly, ozonated air may be pumped into tube 22 during a time when the tub and plumbing are empty of water. In this embodiment, flap valves 42 and other valves closing the plumbing and air system may be omitted. Here, low flow rates and high concentrations of ozone as described herein, in conjunction with limited duration of operation of the ozone generator, such as 10–30 minutes or so, causes the ozone to be consumed by organic loading in the plumbing and air system before outgassing becomes a concern. In addition, any outgassing that does occur within the tub results in the ozone pooling in the bottom of the tub and drain where it reacts with organic compounds until consumed. Thus, outgassing is kept within acceptable limits.

Figure 1A:
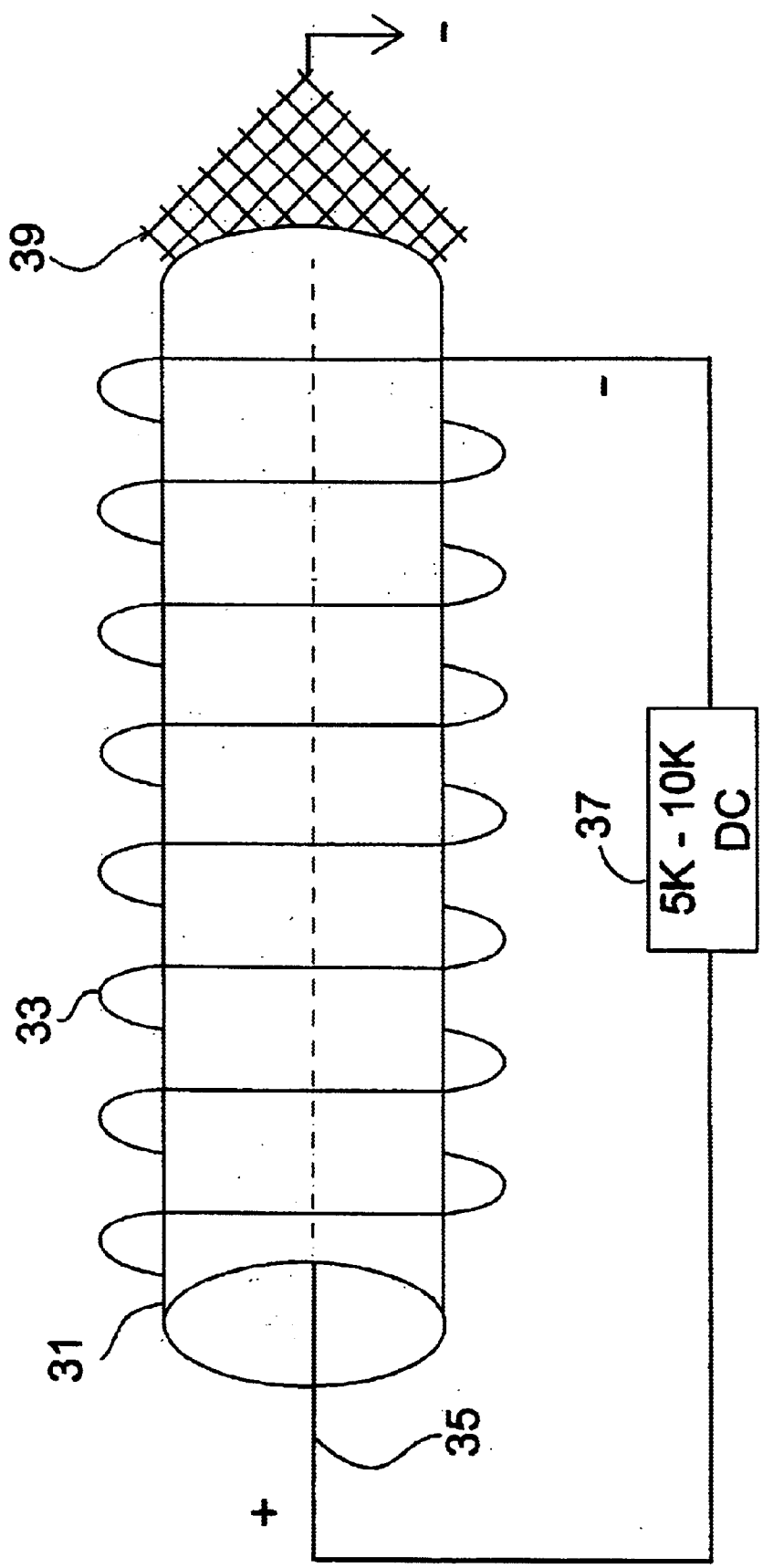
FIG. 1a is a diagrammatic illustration of a new ozone generator of the present invention.

FIG. 1a illustrates another type of ozone generator wherein a low rate of airflow, on the order of about ¼ to about ½ liters per minute, is developed by the ozone generator without a separate pump in order to produce ozone, on the order of about 20–40 PPM, but which may also generate a larger quantity of ozone when the airflow is drawn through the ozone generator by a venturi. In this embodiment, a tube 31 of an insulative material, such as glass or plastic, is provided with an exterior conductive winding 33. An inner electrode 35 extends generally coaxially through the length of tube 31. Winding 33 and electrode 35 are coupled to a DC power supply 37 that provides a DC potential of between 5,000 and 15,000 volts DC, with a positive DC potential from power supply 37 applied to center electrode 35 and a negative potential applied to winding 33. With this construction, diatomic oxygen is ionized by the potential between the center electrode and the winding, which then reforms into ozone.

A screen or grid 39 is positioned at an end of tube 31 opposite the end where electrode 35 enters the tube, and has a negative charge imposed thereon with respect to electrode 35. This embodiment functions to generate ozone in a similar manner as a corona ozone generator, but needs no fan, injector or other apparatus to drive air through the ozone generator. Rather, positively charged ions that are generated by the corona are drawn toward grid 39, which in the process creates an airflow through tube 31. This airflow may be coupled to the tubing of a hot tub, spa or any other such water circulatory system when it is not in use in order to oxidize bioslime and to sterilize the interior parts of the tubing. In addition, such an ozone generator may be used in conjunction with a venturi injector or other mixing device when water is circulating through the tubing in order to provide a much higher airflow of about 2–3 liters per minute at a reduced concentration of about 5–10 PPM or so of ozone to the water. Of course, such a low concentration of ozone in the water reduces outgassing.

As stated, for some embodiments, when the tub or spa is in operation, the amount of air provided to ozone generator 28 may be limited by pump 30 to to generally the pump capacity or slightly greater, typically 1–2 liters per minute at a concentration of about 100 PPM, depending on the design of the pump. This has the effect of increasing concentration of ozone provided to mixing device 31. By providing a bypass 35 and check valve 37 (dashed lines) a larger quantity of air flow, on the order of 2–4 liters per minute at a concentration of about 50–75 PPM may be freely drawn through mixer 31 by venturi principles. This tends to reduce outgassing of the ozone from the tub during use. Conversely, as stated, when the tub is in a dry or semi-dry state, operation of pump 30 develops less airflow of about 1–2 liters per minute through generator 28 with a corresponding increase of ozone concentration to about 100 PPM. During this mode of operation, it is desirable that the airflow be selected so as to produce the most concentrated levels of ozone, which when constrained within the tubes of the tub, as will be explained, completely sanitizes and oxidizes bioslime within these tubes, eliminating the possibility of providing an environment conducive to growth of microbiota therein.

A timing circuit 38 may be coupled to ozone generator 28 and pump 30, and may be used to energize pump 30 and ozone generator 28 for selected intervals of time. In one embodiment, a water presence sensor 40 provided in tub 10 is used in conjunction with timing circuit 38 to indicate presence or absence of water in tub 10, as when the tub is being filled for use or emptied or when the tub is empty of water. It is to be emphasized that such a sensor for merely senses presence of any water in the tub, as contrasted with a level sensor that senses a level of water in a receptacle. Here, a level sensor that allows operation of a water pump responsive to a sensed level of water in the tub will not work with Applicant's invention because with such a level sensor, the plumbing of the tub would already be filled with water by the time the ozone generator is actuated, thus not affording an opportunity for the ozone generator to fill the lines with gaseous ozone while there is no water in the plumbing. Where tub 10 is a hot tub, spa or the like, the water sensor may be configured so as to sense and provide a signal indicative of an empty condition of the tub, as well as when the tub is being emptied or refilled. In this instance, such an empty condition could be opportunistically used to oxidize bioslime and sanitize the tubes of the tub or spa. Here, the timing circuit would activate ozone generator 28 and pump 30 for a predetermined period of time, such as 30 minutes or so. In the case of a jetted tub that is filled and emptied with each use, the timer may be used to activate ozone generator 28 and pump 30 upon initial detection of water in the tub, such as when the tub is being filled, to pump a relatively higher concentration of ozone through the empty tubes of the tub as the tub fills. After the tub is filled, ozone generator 28 and pump 30 operate either for a period of time sufficient for a person to use the tub and empty the tub of water, or upon detection of an empty condition of the tub, depending on the type of sensor 40. Here, sensor 40 would typically measure impedance between two electrodes and provide an indication of water being in the tub if any resistance is found.

After the tub is emptied, such condition may be sensed by the water presence sensor, and the timer energized to operate ozone generator 28 and pump 30 for a selected time interval, such as 15 minutes or so, in order to allow the higher concentrations of ozone to suffuse through the system of tubes, pipes and pump, displacing atmospheric gasses in the process, in order to sterilize the interiors thereof immediately after use.

The ozone may be generally constrained within the tubes, pipes and pump by a valve 42 that blocks jet 20, which valve 42 may be a flap valve that simply lowers by gravity to cover the opening of the jet when the tub is empty. As shown, a recess or clearance may also be provided for the valve so that when open, it does not protrude into the tub. Also, the valve 42 is shown in FIG. 1 as being of exaggerated size, it need only be slightly larger than the jet opening and be hinged just above the jet opening. Alternately, a check valve may be incorporated in the jet or tubing near the jet, such a valve being of the type wherein low impedance is presented to water flowing to the jet during operation. After the water level in the tub is above the flap valve, the flap valve floats to a generally vertical position so that the jet is open, this floating action being facilitated by either a buoyant material 43 fixed to flap 42, or the flap itself may be constructed of a buoyant material. When sterilizing the tubes and pipes of the tub in an absence of water, air valve 24 may be manually closed, thus the closed air valve and flaps over the jets generally prevent escape of the ozonated air from the pipes and tubes around the tub. A one-way or other type valve may be placed in tubing 16 to prevent escape of ozone, but it is believed the impeller blades in pump 12, while allowing positive pressure to escape and possibly permit some leakage of ozone, would generally prevent larger quantities of ozone from escaping from intake 14. Here, leakage of ozone around the impeller blades of pump 12 should be sufficient to sterilize tube or pipe 16 when it is empty of water. Further, as ozone is heavier than air, any ozone that escapes from the water inlet would simply pool in the bottom of the tub and drain until it dissipates or reacts with other compounds. With air valve 26 closed and flap valve 42 blocking jet 20 as described, ozone concentration rapidly builds up within the air and water-conveying pipes and tubes of the tub, killing any microbiota therein including protozoa, algae, molds, fungi, bacteria, viruses and others. Also, the bioslime coat that otherwise would accumulate on the interior surfaces of these tubes is oxidized by the higher concentrations of ozone, the bioslime being mechanically removed by the high rate of water flow through the tubes during use. After the tub or spa is filled with water, the timing circuit may be activated to energize ozone generator 28 and pump 30 for selected intervals as described, or ozone generator 28 and pump 30 may simply be operated continuously as long as pump 12 is operated. This injects ozone at a lower concentration directly into the circulating water, sterilizing the water of the tub and oxidizing contaminants therein. Alternately, as shown by dashed line 43, the timing circuit 38 may be omitted, with sensor 40 coupled to a switch, such as a latching relay (schematically illustrated at dashed line box 45), that maintains operation of ozone generator 30 as long as there is water contacting sensor 40, i.e. water in the bottom of tub or receptacle 10, or in an absence of water in the tub, again depending on the type of sensor 40. Thus, as water is first being introduced into tub 10 and before the water level rises to a point where it enters the jet tubing, and possibly before it enters the intake tubing where such an intake is mounted to a side wall of the tub, ozone generator 28 and pump 30 are energized to pump a higher concentration of ozone into the empty tubes of the tub. This sterilizes and cleans these tubes prior to water being introduced thereinto. Likewise, as water is being drained from the tub, the ozone generator continues to operate until sensor 40 no longer senses water in the tub, allowing ozone to be pumped through the emptying tubes of the tub, sterilizing these tubes after use. Again, sensor 40 may be of the type that energizes the ozone generator upon detection of an empty condition of the tub, and be connected to a timer to operate the ozone generator for a selected length of time. In a variant of this embodiment, a manually operated switch 47 (dashed lines) may be used to manually switch the ozone generator and associated pump 30 "on" and "off" with or without a sensor 40 and timing circuit. This embodiment may be more applicable to larger spa or hot tub where water is retained therein for longer periods of time. In this instance, during a water change, the ozone generator may be switched "on" after the tub is emptied, and may be left to operate for a longer period of time, possibly for hours, in order to allow the ozone to penetrate into every crack and crevice of the tubing, valves and pump of the system. Ideally, in this application, the ozone would be recirculated through the tubing and ozone generator as will be described. The ozone generator may be also switched "on" while the tub or spa is in operation in order to sanitize the water and oxidize contaminants therein. Of course, a manual switch may also be used to operate an ozone generator used on a smaller jetted tub, this embodiment being particularly useful in hotels, motels and other similar locations where jetted tubs may be infrequently used.

Figure 5:
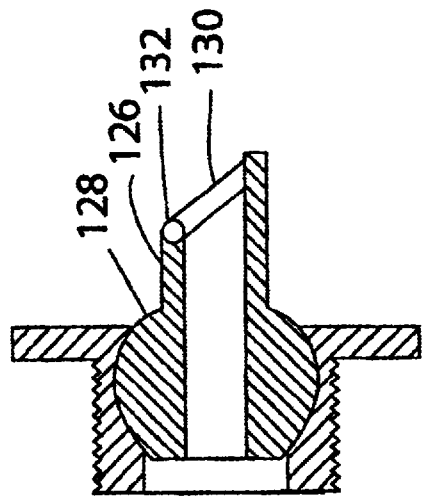
FIGS. 4–10 are various embodiments of flap valves covering tub jets of a jetted tub or spa.
Figure 6:
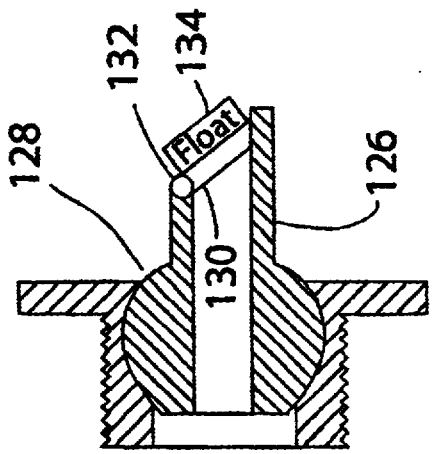
Figure 4:
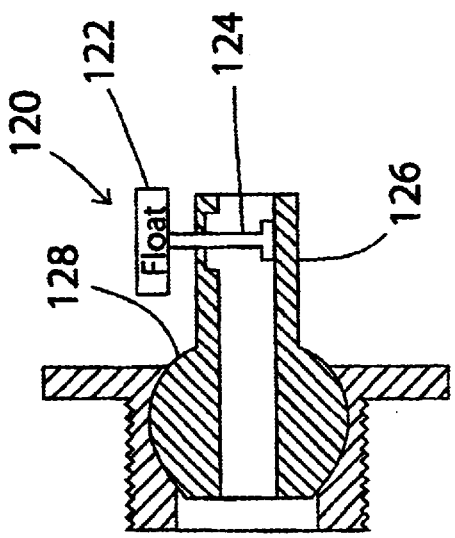
Figure 9:
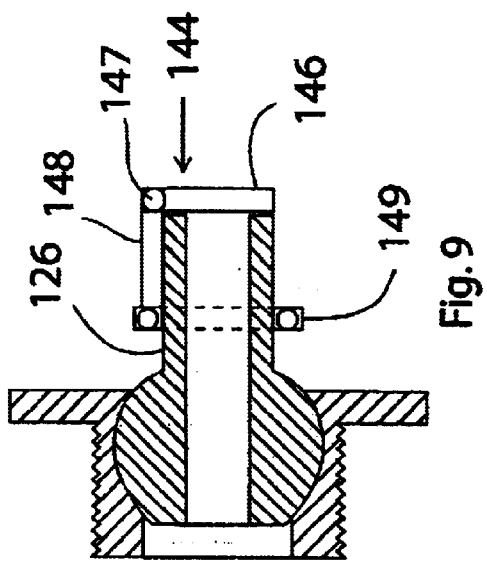
Figure 10:
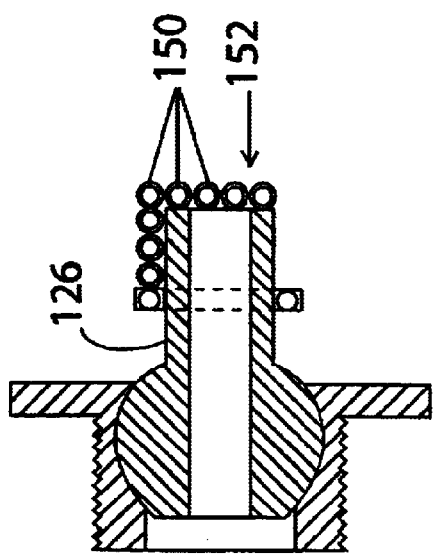
Figure 7:
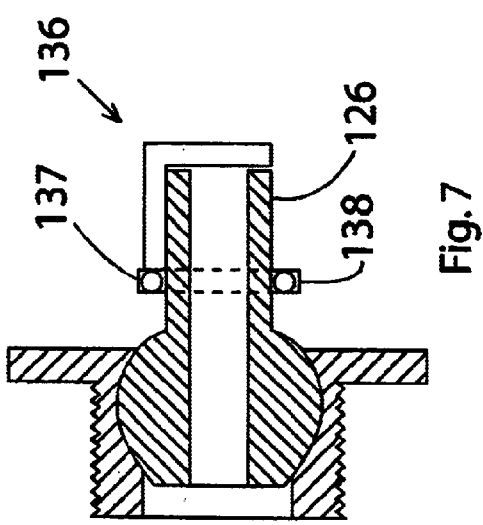
Figure 8:
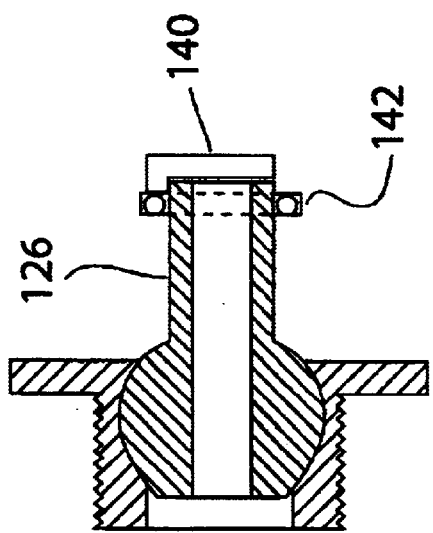

While a flap valve 42 may be suitable for some types of jetted tubs, other types of valves that close automatically when the tub is emptied may be used. For instance, FIG. 4 shows a gate-type valve 120 having a float 122 and a gate portion 24 that is raised and lowered as water covers and uncovers the jet, respectively. This embodiment, and the others that follow, are suitable for use with jet nozzles having a short, tube-like extension 126 typically extending just past a ball portion 128 of the nozzle. FIG. 5 shows an embodiment wherein a flap portion 130 hinged at 132 closes the jet by gravity while water pressure during operation raises flap portion 130. FIG. 6 shows an embodiment wherein a flap portion hingably connected as described above incorporates a float 134 so that when water covers float 134, flap portion 130 is raised to open the jet. FIG. 7 shows an L-shaped flap valve pivotally connected at 137, with a mounting clamp 138 affixing the flap valve to extension 126. FIG. 8 shows a differently configured L-shaped flap valve 140 having a clamping member 142 that clamps to an end region of extension 126. In addition, the embodiment of FIG. 8 may be clamped to a shorter extension 126 than that shown. FIG. 9 shows a flap valve 144 having a flap portion 146 pivotally attached at 147 to a float 148, and clamped to extension 126 at 149. Here, float 148 partially lifts flap 146 from the end of extension 126 when water covers the jet. FIG. 10 illustrates an embodiment wherein a plurality of pivotally linked tubes 150 form a flap 152. These tubes may be hollow and closed at ends thereof so that they float away from an end of extension 126, or of a solid construction from a buoyant material. Alternately, the tubes may not necessarily need to float, but simply be pushed aside by water pressure during operation.

While a number of closures for the water jets are disclosed, it should be appreciated that any closure that generally closes such a jet in the absence of water and which is opened by operating water pressure of the tub or flotation or a combination of both the may be used. Further, such a closure need not necessarily be air tight, but should serve the purpose of generally constraining ozone within plumbing of the system. Also, the air intake system would typically be closed during sterilizing operations in the absence of water in the tubing.

There is at least one jetted tub manufacturer constructing jetted tubs wherein a smaller pump and motor assembly is used for each jet, with the output of each pump of each pump and motor assembly coupled directly to a jet in the tub. Thus, in this construction, a plurality of pump and motor assemblies are mounted directly against the outer wall of the tub. Here, air from a valve such as valve 24 communicates with the suction line for each pump so that the pumps draw a mixture of air and water. In this instance, ozone may be provided to this air line in a similar manner to line 33 (dashed lines in FIG. 1), allowing ozonated air to be drawn into the mixture of air and water. Turbulence in the pump would assist in diffusing the ozone into the water. When the tub is empty of water, as before or after use, the air valve may be closed and the ozone generator and pump combination activated, pumping ozonated air through the tubes and piping of the tub. Impeller blades at each pump would allow concentration of ozone to build up to sanitizing levels while allowing any positive pressure to escape, sterilizing the pump and jet in the process.

Figure 2:
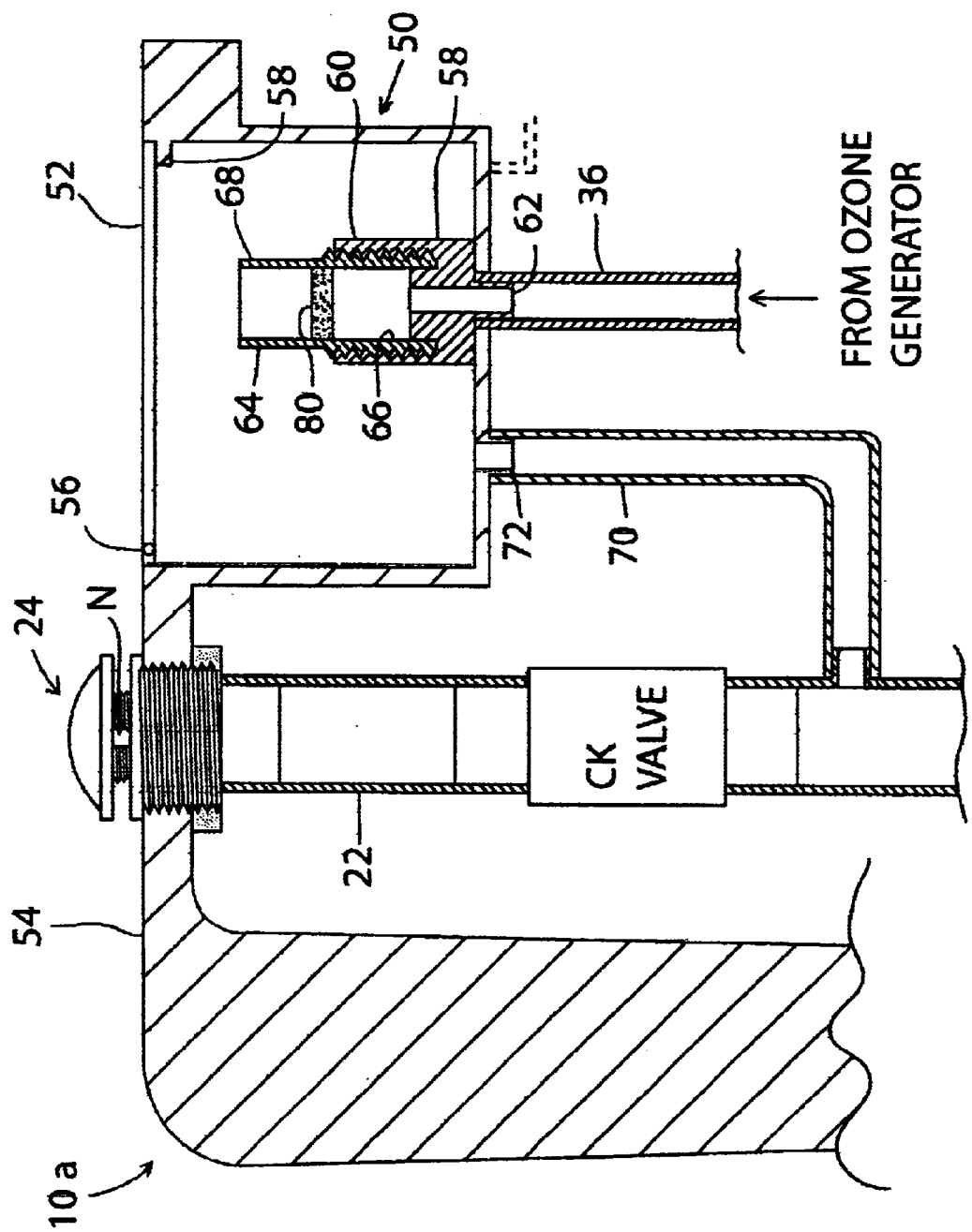
FIG. 2 is a schematic drawing of a second embodiment of the invention.

In another embodiment wherein structure for providing aromatherapy is incorporated in the tub, such structure may be combined with an ozone generator. Referring to FIG. 2, a jetted tub or spa 10a (shown broken away) may incorporate an enclosure 50 having a closure 52 that may be generally flush with an upper surface of the tub edge, and bearing against a lip or flange 54 extending around an opening of the enclosure. Closure 52 preferably would be constructed so as to seal enclosure 50 generally airtight during operation, as should be evident to one skilled in the art. Closure 52 may be attached to tub 10a as by a hinge 56, or closure 52 may be a freely removable cover, and provided with convenient means for lifting (not shown), such as a knob, as also should be apparent to one skilled in the art.

Inside enclosure 50 is provided an adapter 58 having a relatively wide, female threaded region 60 extending into an interior of enclosure 50, and a port 62 adapted to receive a tube, such as tube 36, from ozone generator 28 (FIG. 1). In this embodiment, a second ozone generator may be used, or a larger ozone generator than that described for FIG. 1 (30 watts or so) may be used and the flow therefrom divided between injector/mixer 31 and enclosure 50.

A cylindrical housing 64 open at both ends is threaded at an end 66 to threadably engage female threaded region 60 of adapter 58, and end 68 of housing 64 may be left open. A tube 70 is connected to a port 72 on an exterior of enclosure 50, tube 70 communicating between air tube 22 and port is 72, as by a T-fitting. With this construction, aromatherapy vapor and ozone from port 72 is drawn into the airstream flowing through tube 22 from valve 24. Thus, valve 24 may be adjusted by a user to vary a quantity of air, ozone and aromatherapy available to the jets of the tub or spa. If desired, a second valve may be provided in line 70 to vary the quantity of ozone and aromatherapy independently of air available from valve 24. Of course, the parts exposed at least to higher concentrations of ozone would be constructed of materials resistant to attack by the ozone, as should be apparent to one skilled in the art.

Inside housing 64 is mounted a diffuser 80, which may be a disk of a sintered material, such as stainless steel, through which ozone from ozone generator 28 is passed, the ozone possibly reacting with selected aroma therapy compounds to provide a more intense or therapeutic aroma therapy. Diffuser 80 serves to receive compounds, generally in liquid form, used in aroma therapy and other scented compounds, the vapor from these compounds being drawn into the airstream for the tub or spa jets and thereafter into the water of the tub. Due to the relatively large bubble size produced by mixing of air, aromatherapy vapor and ozone at jet 20, little diffusion into the water of the aromatherapy vapor and ozone would occur prior to the bubbles rising to the surface and scenting the air above and around the tub with the aromatherapy scent and ozone. As is known, ozone is produced in nature during thunderstorms and other natural phenomena, the scent of which being associated with a "freshness" and "outdoorsy" quality. To this Is end, quantity of ozone from the ozone generator may be regulated or metered to aromatherapy enclosure 50 as by a valve or constriction in tube 36. In this instance, extra air may be provided in enclosure 50, as by an extra air port 63 (dashed lines) sized to allow a selected quantity of air to be drawn into enclosure 50.

While a diffuser of a sintered material is disclosed, the diffuser may be constructed of any suitable material in any form that would pass ozone and receive an aromatherapy compound that would impart a particular scent to the air circulating over and around through the tub. In a variant of the embodiment shown in FIG. 2, the diffuser structure may be placed directly in the airstream from valve 24 and be provided with a port to draw ozone from ozone generator 38.

Housing 64 containing diffuser 80 is constructed to be easily replaceable so that a user may readily remove a housing 64 containing one aromatherapy compound and replace it with another housing 64 and diffuser 80 having a different aromatherapy compound thereon. Here, the user simply opens closure 52 and unscrews housing 64 from adapter 58 and replaces that housing 64 with another housing 64 containing the different aromatherapy compound. This eliminates the need to clean housing 64 and diffuser 80 each time a different aroma therapy compound is desired to be used. As such a user may purchase separately or be provided with a collection of housings 64, each with its own distinct aromatherapy compound so that the user to may select a particular aroma or other compound according to his/her preferences. In the instance where the aroma in a housing 64 fades, the user may simply renew the aroma by placing a drop or so of the aromatherapy compound in its liquid form onto the diffuser 80 or elsewhere within housing 64.

Figure 3:
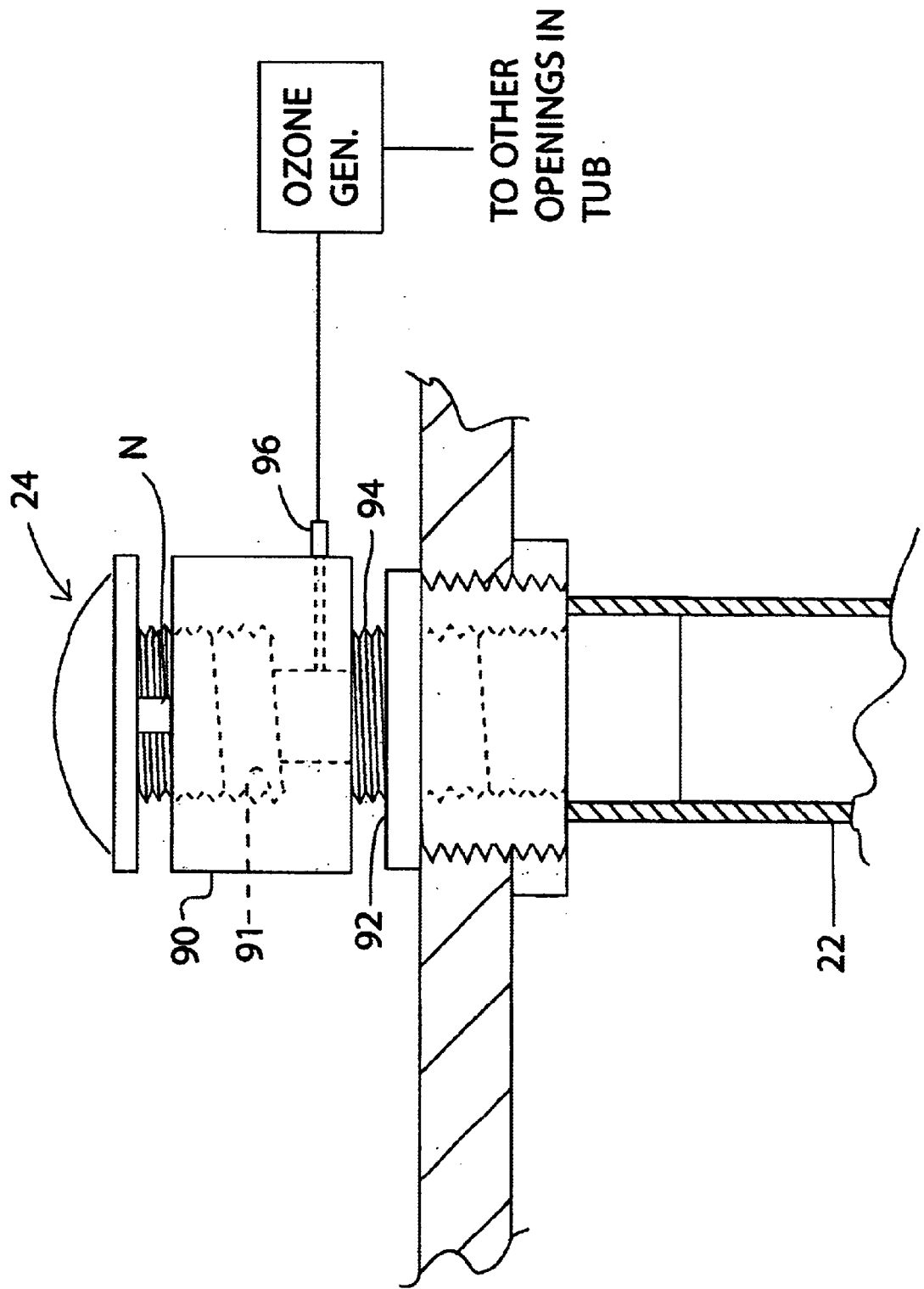
FIG. 3 is a diagrammatic view of one embodiment of the invention for retrofit to a jetted tub or spa.

In one embodiment for retrofitting an existing installed jetted tub or spa with an ozone generator, reference is made to FIG. 3. Here, the air valve 24 (FIG. 1), which in most instances is a threaded plug having a notch N running the length of the threaded portion, is replaced by an adapter 90, shown partially threaded into opening 92 that otherwise would receive valve 24. Adapter 90 may be constructed including a valve 24, or the existing valve 24 removed from opening 92 in order to accommodate adapter 90, valve 24 then being threaded into opening 91 (dashed lines) of adapter 90. Opening 91 in turn communicates with tube 22 via an opening through threaded portion 94 of adapter 90. A port 96 may be provided in adapter 90, port 96 coupled at least to an ozone generator, and possibly a pump 98 located or mounted inside the enclosure area of the tub or remote from the tub. A switch 100 may be provided to switch the ozone generator, and if used, pump 98 ON and OFF. Flap valves may be installed over each jet, or plugs may be provided to plug the jets. In some instances, these plugs may be provided with a relief mechanism to prevent positive pressure from building up within the tubes and piping of the tub. Here, and in the other embodiments, some airflow through the jets is necessary in order to displace air therein with ozonated air.

Figure 11:
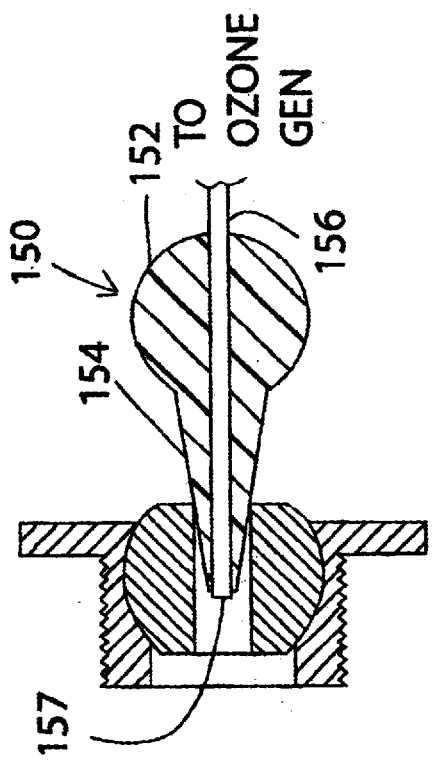
FIG. 11 is one embodiment of a plug fitting for providing ozone to or from a jet of a jetted tub or spa.
Figure 12:
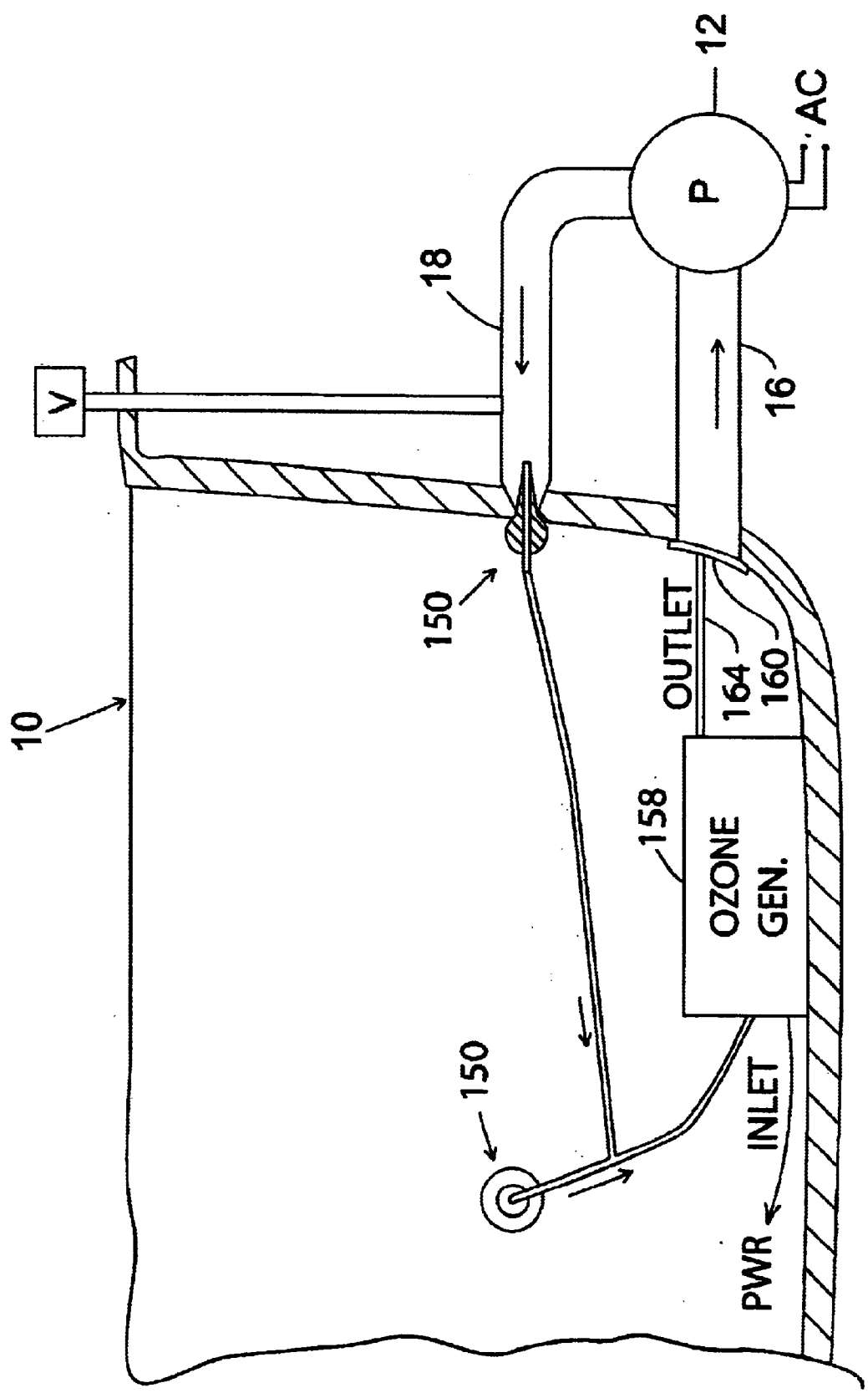
FIG. 12 is a diagrammatic illustration of one embodiment of a portable sanitizing apparatus of the present invention.

In another embodiment of a retrofit ozone system for recirculated ozone back through the tubing of the spa, and referring to FIG. 11, a plug 150 having a generally spherical grip portion 152 and a tapered plug portion 154 is shown. A flexible tube 156 either extends through or communicates with an opening 157 through plug 150, the tube being connected to an ozone generator 158 (FIG. 12), which may be portable or mounted in a safe location. In the instance where the ozone generator is portable, the ozone generator may be housed in a generally waterproof housing and simply be placed in a tub or spa as shown in the absence of water in the tub during a sanitizing operation. In the retrofit embodiments, ozone generator 158 may incorporate a low flow air pump in order to pump a mixture of ozone and air into the jets and the tubing of the tub, or may employ an ozone generator permanently retrofitted in the tub enclosure and utilizing a different mechanism, such as a convection effect, in order to provide a low rate of ozone flow to the air tubes and plumbing of the tub, as will be further explained. As shown in FIG. 12, a cover 160 may be used to cover a water intake 162 of the tub, this cover attaching to the water intake by any means available to one skilled the art, such as a close fit where the water intake protrudes from a side or bottom of the tub, suction cups that hold the cover in place, or where there is a grating in the bottom of a spa, a mat-like cover may simply be placed over the grating.

In a similar manner as disclosed for the plugs 150, a flexible tube 164 may connect a cover 160 to an air intake port of the pump within ozone generator 158, making the system a closed loop system. In this embodiment, ozone-containing air may be circulated at a low rate of flow, which may be on the order of around 0.5 to about 2.0 liters of air per minute with a resulting concentration of about 150–50 PPM, throughout the plumbing system of the tub simply by pumping it into the jets and returning the ozonated air to the pump via water suction intake 162. In the instance where an air pump is used, seals and other parts of the air pump may be constructed of ozone resistant material such as TEFLON™, VITON™ or other similar materials. With such a closed loop system, concentration of ozone increases over time to a higher level than in a system wherein ozone is simply injected into the water, insuring that any bioslime deposits are oxidized and the plumbing, pump and other interior parts of the tub or spa are completely sterilized. As stated, ozone generator 158 may be placed in the bottom of the tub, hung on a wall adjacent the tub or placed in any other convenient location, including the tub enclosure containing the tub plumbing and pump. A timer as described above may also be incorporated in the ozone generator to only allow the ozone generator to operate for a selected period of time, such as an hour or so. Alternately, ozone-containing air may be pumped into water suction inlet 162 and returned to ozone generator 158 via jets 50 and tubing 156. As should be apparent, the output of the ozone generator may be coupled to any of the ports, with the intake of the ozone generator being coupled to any oppositely positioned port in the water or air circulation system in order to effect a circulation of ozone through plumbing and tubing of the tub. Likewise, the output of the ozone generator may be applied to a plurality of the ports, with the remaining ports coupled to the intake of the ozone generator.

Figure 13:
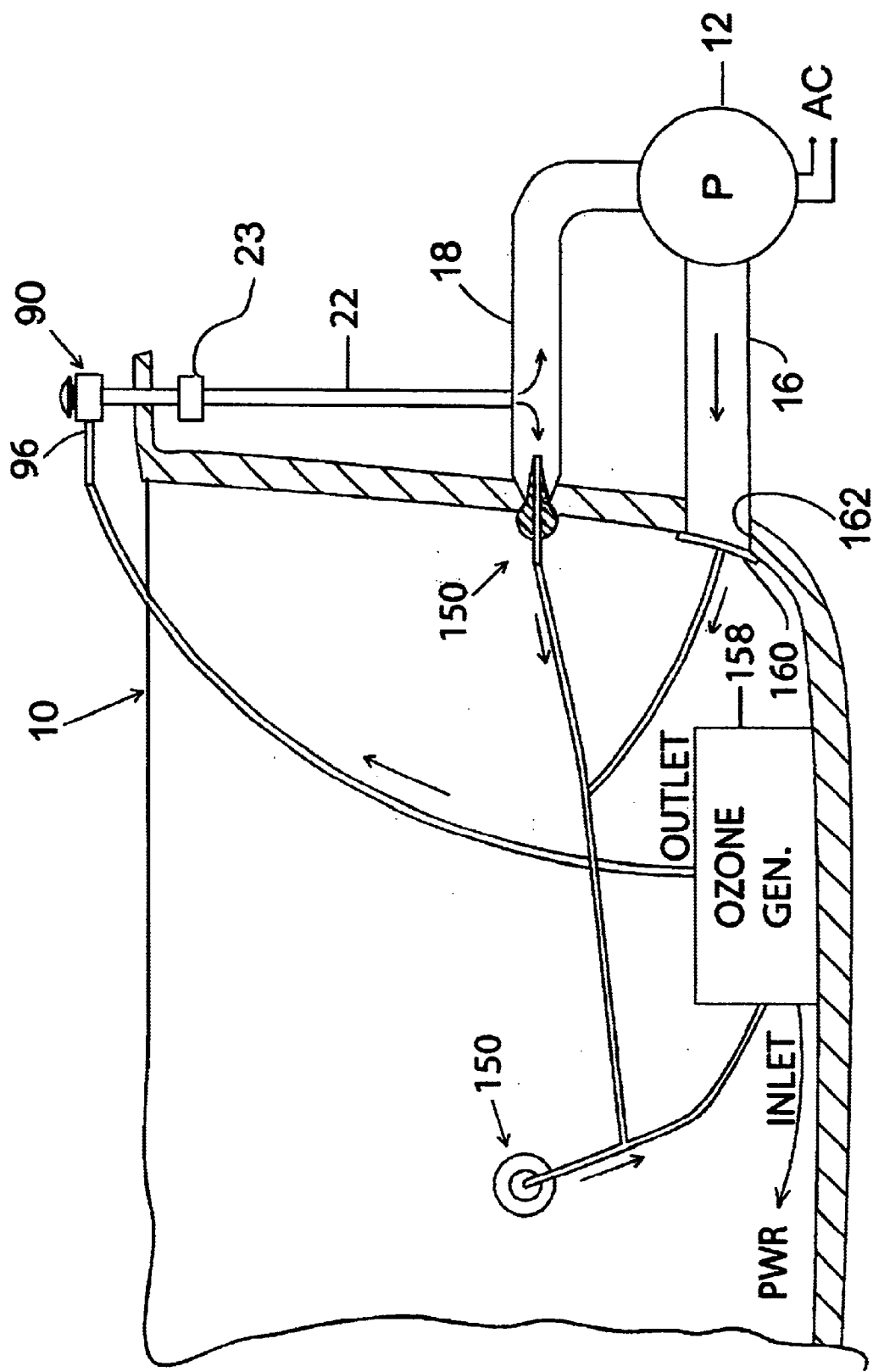
FIG. 13 is another embodiment of a sanitizing apparatus of the present invention.

A closed loop system may also be coupled with the retrofit embodiment as shown in FIG. 13, with tubing coupled to port 96 of the adapter simply by a friction or by a quick-disconnect coupler. Alternately, a tube to/from the ozone generator to the air intake system may simply be positioned therein with a plug as described for the jets. Here, flow of ozone-containing air may be in either direction through adapter 90, which in turn communicates as described via the air intake tubing 22, tubing 18, pump 12 and tubing 16 to the ozone generator. In this manner, the air and ozone mixture is continuously recycled through the ozone generator in a closed loop that builds up and maintains a relatively high concentration of ozone for oxidizing and preventing bio-slime growth.

When the tub is to be used, the cover over the water intake is removed and the plugs removed from the jets, allowing the ozone generator and associated tubing, plugs and cover to be stored. As stated above, and with respect to FIG. 3, an ozone generator may be permanently or semi permanently installed in conjunction with adapter 90 for allowing ozone to be injected into the water during use, with other water circulation openings in the tub being left open.

Figure 14:
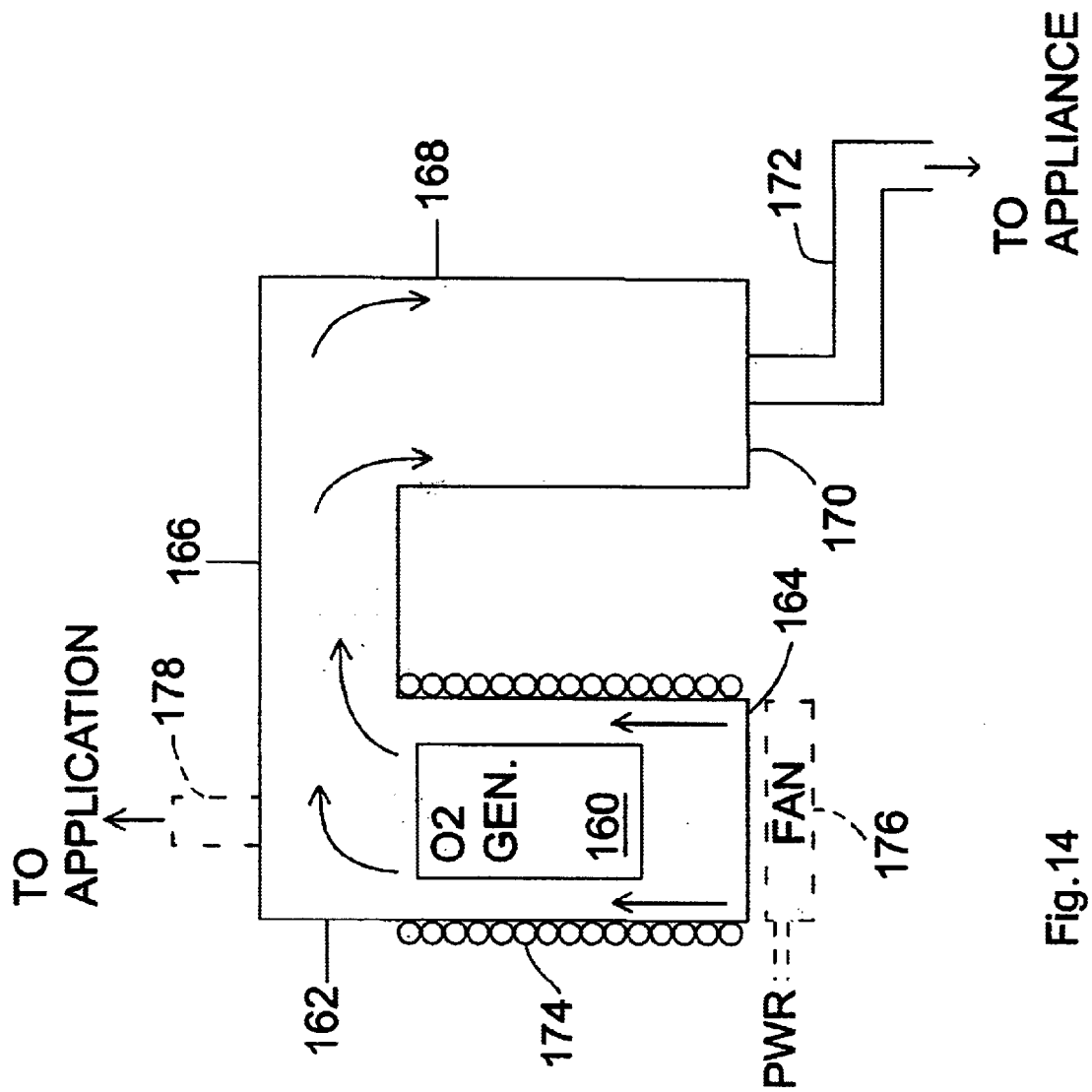
FIG. 14 is one embodiment of an ozone generator utilizing a chimney effect to move air therethrough.

In another embodiment of an ozone generator, and as shown in FIG. 14, an ozone generator 160, which may be a corona discharge ozone generator or a ultraviolet light type ozone generator as described above, is positioned or mounted in a vertically oriented housing 162 having a generally open bottom 164. A top region 166 of housing 162 communicates with a downwardly extending housing 168. A bottom region 170 of housing 168 may be open, or may be connected to a tube 172 through which air containing ozone is provided to the article to be sterilized or sanitized. In this embodiment, a chimney or convection effect is used to draw air upward past the ozone generator and into housing 168, where the ozonated air is cooled, causing it to sink to the application. As such, heat developed from operation of the ozone generator causes air to rise past the ozone generator 160 and into communicating member 166. In some instances, a heating coil 174 may be wrapped around housing 162 to increase the chimney effect from heating, or a coil with water circulating therethrough may be wrapped around housing 168 increase cooling of the air. Additionally, a fan 176 (dashed lines) may be located at the opening 164 of housing 162 in order to increase air moving through the apparatus. In yet another embodiment, the housing 162 may be used by itself with an ozone generator 160 therein, with heated ozone-containing air being passed from a tube or connection 178 (dashed lines) at an upper end of housing 162.

As ozone is heavier than air, the ozone in the air tends to settle through housing 168 and emerge at the open end 170 thereof or settle into tube 172. In this type of ozone generator, airflow past the ozone generator portion is relatively slow, which tends to develop a relatively high concentration of ozone that provides optimum sterilization and oxidation of bioslime and associated organisms. Thus, such an embodiment is useful where out gassing from the application is a concern.

The embodiment of an ozone generator as shown in FIG. 14 is useful inasmuch as it does not require an air pump to move air past the ozone generator portion of the apparatus and subsequently into plumbing and air tubes of a jetted tub, hot tub, spa or other similar facility. Further, as stated, this embodiment of an ozone generator provides a low rate of airflow, perhaps ¼ to ½ liter per minute at a concentration of 300–50 PPM. As the ozone is recirculated, the concentration rises to levels required to oxidize bioslime.

In other anticipated uses, such a convection driven ozone generator may be used to provide ozonated air having a relatively high concentration of ozone to a shower head 180 and associated plumbing 182, as shown in FIG. 15. Here, a convection driven ozone generator 184 draws a low rate of air flow as described by a chimney effect into a bottom thereof, as indicated by an arrow, with the heated air rising through a tube 186 and through a check valve 188 to the plumbing 182 and shower head 180. FIG. 16 shows an embodiment similar to that shown in FIG. 15 except a venturi 190 is shown connected in the flow of water to shower head 180. In this embodiment, ozone would also be provided to sanitize water emitted from the shower head. As described, when the shower is not in use, the ozone would tend to settle into the plumbing 182, displacing air within the plumbing down to a point where a selection valve is typically located that switches water flow from the tub to the shower head. This sanitizes the interior of such plumbing and oxidizes any bioslime that forms. This embodiment is ideal for shower installations such as in hospital rooms, motels, hotels and the like where the showers may not be used daily. Even where the showers are used daily, such as in a residential application, such an installation would maintain plumbing in a sanitized condition. In the embodiment of FIGS. 15 and 16, the ozone generator may be continuously energized, or operated by a timer for selected periods of time. As stated, out gassing of ozone through the shower head would be minimal due to the low air flow through the ozone generator and settling of the ozone into the plumbing. In this instance, the ozone generator may be restricted or otherwise constructed to provide an airflow through the ozone generator of from about 0.01 to 0.5 liters per minute at 30–40 PPM or so depending on a power rating of a combined ballast and lamp in an ultraviolet ozone generator or corona-type ozone generator. In addition, such an embodiment is useful to provide relatively high concentration of ozone to a water circulation system of a spa, hot tub or the like, particularly where flap-type valves are provided to block the water outlets and a cover is used to block the water inlet. Here, if the ozone is provided at a highest point in the water circulation system, outgassing is minimized because the pooled ozone in the water circulation system would simply back up to the ozone generator, where it would generally stop airflow therethrough, limiting leakage of ozone into the tub area.

FIG. 17 shows a convection driven ozone generator 184 as described in the foregoing connected to provide ozone via a tube 192, 194 to a tank portion and bowl portion 196, 198, respectively, of a toilet. Significantly, tube 192 in toilet tank 196 is of a length so that the tube 192 extends downward into the tank to a point above a water level W2 that the water drops to at its lowest point during flushing. In this embodiment, heated air would rise through ozone generator 184 and, when tank 196 is filled with water to water level W1, i.e. blocking tube 192, ozone flows through tube 194 and settles into toilet bowl 198, thus sanitizing toilet bowl 198. During a flushing operation of the toilet, the water level in the tank 196 and tube 192 drops rapidly, drawing an impulse of ozonated air through tube 192 and into toilet tank 196. In this manner, sanitizing ozone may be provided to a toilet tank 196 during a flushing operation, where it is constrained, and continuously to a toilet bowl 198.

In another embodiment for use with a jetted tub, reference is made to FIG. 18. Here, a convection driven ozone generator 200 is shown having a vertically oriented housing 202 containing an ultraviolet lamp 204 and associated ballast 206, or alternately a corona ozone generator. A timer 208 may be used to provide power to the ballast at timed intervals. Air heated by ballast 206 and lamp 204 rises and exits at tubes or fittings 210, in turn coupled to air plumbing and water plumbing (diagrammatically illustrated as dashed lines) of a jetted tub. In addition, ozone-containing air from ozone generator 200 may, but not necessarily, be provided to a venturi 212 for mixing ozone into water of the tub or spa.

In this embodiment, and as described in the foregoing, ozone generator 200 provides a low air flow of a higher concentration of ozone when the jetted tub is empty of water, and a lower concentration of ozone to water if used in this manner when the tub is in use. Thus, outgassing of ozone when the tub is not in use is largely prevented due to the low air flow rate, and when the tub is being used, outgassing is minimal due to the lower concentration of ozone provided to the water. As stated, this ozone generator may be allowed to operate continuously or during intervals as determined by timer 208.

In use, and referring to FIG. 1, as a user of a jetted tub begins to fill the tub 10, sensor 40 detects the presence of water filling the tub, and provides a signal to timing circuit 38. Circuit 38 is initialized responsive to the signal from sensor 40, and provides an energizing current to ozone generator 28 and pump 30, which begin to pump a higher concentration of ozone into the water and air conveying tubes of the tub. With the flaps of the various valves covering the jets and air valve 24 closed by the user, ozone concentration rapidly increases within the tubes of the tub, serving to immediately sterilize the interior of these tubes and oxidize contaminants therein prior to water filling the tub. Any positive pressure building up in the tubes is released by at least one of the flaps briefly opening by the pressure to relieve the pressure. Timing circuit 28 may be set to cause ozone generator 28 and pump 30 to operate after the tub is filled, sterilizing the water as it is circulated through the tubes. Alternately, as described, a switch may be used to activate ozone generator 28 and pump 30 prior to use. As sensor 40 may also detect when the tub is emptied, the timing circuit may be set to operate ozone generator 28 and pump 30 for a short interval after the tub is emptied, insuring the tubes are sterilized and any bioslime oxidized after use. Where a switch is used, generator 28 and pump 30 may simply be left ON for a period of time after the tub is drained. Circuit 38 or the switched embodiment may further incorporate a clock/timer in order to operate ozone generator 28 and pump 30 on a daily basis for a relatively short interval, such as 15 minutes or so, at a time when the tub is not in use, such as in the middle of the night or during the day, so as to daily sterilize the tubes at a preset time.

In the instance of a spa where the water is maintained in a manner similar to a swimming pool, timing circuit 38 may be set to energize ozone generator 28 and pump 30 for a preset period of time upon activation of pump 12, i.e. when the spa is in use. Additionally, a clock/timer as described above may be set to initiate operation of pump 12, ozone generator 28 and pump 30 for a preset interval on a daily basis in order to sterilize water in the spa. Additionally, when the water is changed, a sensor 40, float switch or a manual switch as described above may be incorporated to sterilize the tubes and oxidize contaminants when the spa is emptied of water. Additionally, the ozone generator as described may be used in combination with conventional sanitizers to sterilize water in a hot tub or spa.

The embodiment of FIG. 2 would operate as described above, with the user selecting a particular aroma or scent to be imparted into the air over and around the tub. As described, to change the aromatherapy, the user merely opens closure 52 and unscrews one housing 64 containing one aromatherapy and replaces it with another housing 64 containing a different aromatherapy, after which the ozone generator and pump would be ready for operation. In this embodiment, the ozone flowing therethrough would also keep the environment of the aromatherapy structure sterile.

In order to sterilize the tubes of the tub or spa using the embodiment of FIG. 3, air valve 24 is closed and switch 100 operated to energize generator and pump 98. This pumps a higher concentration of ozone into the empty pipes and tubes of the tub. After the tub is filled, valve 24 may be opened to provide a mix of ozone and air to water of the tub, although less diffusion of ozone into the water in the tub would occur due to larger bubble size, as earlier described. Operation of the embodiments of FIGS. 4–18 is as described in the foregoing.

Referring now to FIG. 19, a schematic diagram of a stand-alone ozonating and sanitizing system is shown. The term "stand-alone" refers to an integrated system that may be simply attached to a hot tub or spa without disturbing existing plumbing thereof. Here, referring to lines 300 and 302 of FIG. 19, line 300 is a return line to the spa and line 302 is a suction line through which water is drawn from the spa. As such, the only modification to a spa for installation of the systems of FIG. 19 and FIG. 20 is to cut openings for lines 300 and 302. While the embodiments of FIGS. 19 and 20 are primarily intended for and sized to use in conjunction with a hot tub or spa wherein water is maintained for longer periods of time, such as a month or so, these systems may also be constructed on a larger scale for use with swimming pools.

Initially, a water pump 304, which may be a relatively small capacity circulation pump of about 5 gallons per minute, draws water from the spa through line 302. However, the water so drawn is not routed directly to a suction side S of pump 304. Rather, the water is drawn, as a motive flow, through a venturi 306 incorporating check valves 308 and 310, such a venturi being disclosed in Applicant's U.S. Pat. No. 6,192,911, and which is incorporated in its entirety herein by reference. Venturi 306 serves to mix ozonated air from ozone generator 312, which may be configured a shown in Applicant's patent application Ser. No. 09/717,904, filed Nov. 20, 2000, and which is incorporated herein in its entirety by reference. The motive flow from venturi 306 then passes to a T-fitting 314 where chemicals including sanitizing compounds are mixed with the motive flow. Advantageously, potassium bromide may be used, which is not a dangerous chemical to transport via conventional, inexpensive transport services. Likewise, sodium bromide may also be used, which is also transportable by conventional transport services, and alternately, sodium hypochlorite may be used. From T-fitting 314 the motive flow passes through a contact region 316, which may be tubing arranged in a serpentine configuration as shown, or the contact region 316 may be configured as shown in Applicant's patent application Ser. No. 09/752,982, filed Dec. 31, 2000, which is incorporated in its entirety herein by reference or Applicant's patent application Ser. No. 09/794, 601, filed Feb. 27, 2001 also incorporated herein by reference in its entirety. From contact region 316 the motive flow passes into an air-removing column 318 where outgassing from the motive flow is removed. Column 318 may be configured as shown in Applicant's patent Ser. No. 09/418, 915, which is incorporated herein in its entirety by reference. As a feature of the latter referenced patent, a float or similar valve 319 closed when a water level in the column was raised to a level where it would exit valve 319. In the instant embodiment, float valve 319 is normally open, with the outgassed air and ozone being drawn through a cross-connection 323, ozone generator 312, and back into the motive flow at venturi 306. This forms a closed-loop system with respect to outgassing. At cross-connection 323 a bleed check valve 324 and a make-up biased check valve 325 is provided, valve 325 having a selected bias of about 8 psi. Valve 324 serves to allow positive air pressure within the system to bleed off after the system is powered down. Make-up check valve 325 allows entry of air into the ozone generator to "makeup" for air dissolved or diffused into the motive flow. From column 318 the motive flow is drawn into the suction side S of water pump 304. The flow is discharged from pump 304 at the discharge side D to a T-fitting 320, one side of T-fitting 320 providing flow to the spa via line 300 and the other side of fitting 320 coupled via a check valve 322 and line 324 to a chemical dispenser 326 holding at least a slow-dissolving sanitizing compound. Lines 324 and 328 are open to the sanitizing compound in dispenser 326, with water simply being exposed to the compound as it flows between lines 324 and 328. Dispenser 326 may be configured with a removable cartridge holding the sanitizing compound so that when the cartridge is removed, air is drawn into the motive flow through line 328 to fitting 314. This switches pump 304 "off", as will be described. Alternately, dispenser 326 may be configured with a removable, sealed lid or top that when removed also breaks the suction to fitting 314 to switch pump 304 "off". Alternately, an electrical switch may be incorporated in the dispenser to switch pump 304 "off" when the dispenser is opened. Check valve 322 is a biased valve requiring at least ½ PSI or so to open. However, as line 300 from discharge side D of pump 304 is sized to be nonrestrictive of water flow with respect to pump 304, the pressure required to overcome the bias of check valve 322 is developed by suction side S of pump 304 via column 318, contact region 316, connection 314 and lines 328 and 324. In addition, the pressure at which check valve 322 opens regulates flow of water through chemical dispenser 326. Thus, the bias of check valve 322 is carefully selected to mix an optimum quantity of dissolved sanitizer with ozonated water at T-fitting 314 so as to provide about 0.5 PPM of residual halogen in the water. Of course, other proportions of halogen and ozone may be used. Completing the system is a flow switch 330 coupled in line 300 back to the spa. Switch 330 is conventionally coupled (not shown) to provide electrical power to pump 304 as long as water flow from pump 304 is maintained. In addition, switch 330 incorporates a timer to provide a time delay of approximately two minutes or so within which chemicals may be provided to chemical dispenser 326 and the dispenser sealed, this time delay also serving to allow air to bleed from the system, as will be described.

During operation of the embodiment shown in FIG. 19, water drawn through tube 302 under influence of the suction side S of pump 304 initially passes through venturi 306 where ozonated air from ozone generator 312 is mixed with the water. As stated, air is drawn through ozone generator 312 from either or both make-up check valve 325 or the outgassing of column 318 from float valve 319. This is advantageous in that outgassing to atmosphere from column 318 is eliminated. In addition, where a corona ozone generator is used, design of such an ozone generator for use in such a humid environment would be such that there is no metal to be corroded by products generated by the arc discharge. In other words, the interior of this ozone generator would be mostly ceramic or similar substances. While ozone output of this generator would be reduced by high humidity, this would also serve to hold the output of the ozone generator relatively constant. In addition, while the ozone output is lower, substantial quantities of hydrogen peroxide and hydroxyl radicals are produced, increasing reaction dynamics in the water that increases oxidation destruction of contaminants and organisms in the water. Further, in a closed loop system as disclosed above, argon concentration in the off gassing is gradually increased as oxygen is converted to ozone, which increases efficiency of the corona generator.

On the discharge side D of pump 304, sanitized water is returned to the spa via tube 300, with some of this water passing through check valve 322, which as described, is biased to provide a selected water flow to chemical dispenser 326, where the water is provided with sanitizer. From dispenser 326 the sanitizer-containing water is provided to T-fitting 314. Here, this sanitizer-containing water is drawn into the ozonated motive flow as a result of suction from suction side S of pump 304. The sanitizer and ozone are allowed to react with each other and with the water in contact region 316, after which the water passes to gas removal column 318, which functions generally as described in Applicant's referenced patent. During operation of the system, if the chemical is cartridge or lid is removed from chemical dispenser 326, the suction in line 328 is interrupted, rapidly permitting line 328, contact region 316 and column 318 to be evacuated of water and fill with air. Simultaneously, interruption of the suction causes biased check valve 322 to close, diverting all the evacuated water from column 318, region 316 and line 328 to the spa via line 300 and preventing water from entering chemical dispenser 326. When a level of water in column 318 is evacuated to a point where air is drawn into suction side S of pump 304, causing pump 304 to cavitate, flow switch 330 interrupts electrical power to pump 304, switching it "off". Concurrently, the two-minute time delay is initiated. During this time delay, water from the spa enters the system via line 302 and slowly fills contact region 316 and column 318, with air therein being released or bled via check valve 324. With this construction, the system is self-priming after replenishing chemical dispenser 326. After expiration of the 2-minute time delay, and assuming that dispenser 326 is refilled and sealed, flow switch 330 applies electrical power to pump 304, initiating operation of the system which proceeds as described in the foregoing.

While potassium bromide, sodium bromide and sodium hypochlorite are disclosed by way of example as sanitizing chemicals used in the chemical dispenser, other chemicals such as sodium bicarbonate, magnesium sulfate heptahydrate (epsom salts) and ph buffering compounds may be included along with sanitizing compounds in the chemical dispenser. In this instance, these chemicals react with ozone and form residual compounds (ozonites) such as hydroxyl radicals and other biologically energetic molecules. These compounds and radicals react with organisms and organic matter in the water in the contact region 318, and are thus mostly consumed by the time the water returns to the spa. As a result, while the water has a halogen residual of about 0.5 PPM just after fitting 314, water returned to the spa typically has almost no halogen content until the organic content and other contaminants in the water is reacted with ozone and ozonites, at which point the halogen content in the spa rises.

FIG. 20 illustrates a similar system, one wherein a water circulation pump 350 draws water to suction side S via a line 352 and a safety valve 354 from a spa. Valve 354 operates to allow air into pump 350 in the event an inlet to line 352 becomes blocked. On the discharge side D of pump 350, water is provided as a motive, pressurized flow to venturi 356 as described in Applicant's referenced patent. On one port A of venturi 356, a check valve 358 allows ozonated air from ozone generator 360, which may be as described in the referenced patent application for FIG. 19, to be mixed with the motive flow of water. Check valve 358 is a biased valve, with the bias carefully selected so as to provide a proper proportion of ozonated air (with respect to sanitizer) to venturi 356 as described for FIG. 19. To the other port B of venturi 356 is provided via line 360 a flow of water containing sanitizer from chemical dispenser 362. From venturi 356 the motive flow passes to contact region 364, which may be as described for FIG. 19 in Applicant's referenced patent application, and from contact region 364 the motive flow passes to air separator column 366, also as generally shown in Applicant's referenced patent as described for FIG. 19. From column 366 the flow water is returned via line 368 to the spa. A float valve 370 operates with column 366 to close when water raises to a level where it would otherwise exit valve 370. As described above, water in air separator column 366 may only occasionally rise to this level, at which point some water may pass, or "sputter" through valve 370. From there, it passes via line 372 to T-fitting 374 where the water flows via line 376 under influence of gravity to the venturi and is drawn into the motive flow. Otherwise, outgassing in column 366 is passed via normally open float valve 370 via line 372, fitting 374 and line 378 to an air cavity 380 in chemical dispenser 362. Cavity 380 is open to atmospheric pressure via an inlet 382. Thus, fitting 374 serves as a second separator that separates water from air, passing water downward to venturi 356 and air upward through line 378 to air cavity 380. Here, the outgassing is drawn via line 384 through ozone generator 360 under the influence of suction from venturi 356. Air inlet 382 communicates between cavity 380 and the atmosphere, and allows extra air (makeup air) into the system as air and ozone is dissolved and diffused into the water. A biased check valve 386 having a bias of about one pound or so is provided in line 376, this valve remaining normally closed in the event no water is flowing through line 372. A combination of weight of the water in line 376 and suction from port A of the venturi occasionally causes check valve 386 to open, draining any water in line 376 to the venturi. At air separator column 366, a biased check valve 388, which may be biased with about ½ pound, opens when the suction from the venturi reaches this level. With valve 388 open, water is drawn via line 389 through check valve 388 into chemical dispenser 362 which holds a quantity of slow-dissolving sanitizer as described, and where it provides dissolved sanitizer to the water. As stated, this sanitizer may preferably be potassium bromide, sodium bromide or alternately sodium hypochlorite, or any other sanitizing or other compound that beneficially reacts with ozone. The sanitizer-containing water drawn through line 360 is provided to venturi 356 where the sanitizer and ozonated air are simultaneously mixed and provided to the motive flow. A normally closed check valve 390 opens when the chemical dispenser is opened, as will be explained.

Operation of the embodiment as shown in FIG. 20 is such that water from the spa drawn through line 352 to suction side S is passed to discharge side D to venturi 356. Ozonated air and sanitizer-containing water are mixed at venturi 356, with a proportion or ratio of ozonated air to sanitizer-containing water determined by a carefully selected bias of valve 358. As stated above this bias is selected so as to provide a residual halogen level of about 0.5 PPM just after venturi 356 as described, although other ratios may be used. The motive flow containing sanitizer and ozonated air is passed to contact region 364, where the sanitizer, ozone and water are allowed to react. From the contact region the flow is passed to air separator 366 where outgassing is provided via float switch 370 to fitting 374 where it is drawn into air cavity 380. It should be noted that air cavity 380 is separated, typically by a wall, from the chemical dispenser.

The outgassing is drawn through ozone generator 360 and passed to venturi 356, thus forming a closed-loop system with respect to outgassing. Any water the passes through float valve 370 is returned via fitting 374 and check valve 386 to venturi 356. Water is also drawn under influence from venturi 356 from air separator 366 via biased check valve 388 to chemical dispenser 362. The water then takes up selected qualities of sanitizer, as determined by flow rate through the dispenser and the rate at which the sanitizer dissolves, with this sanitizer-containing water provided to venturi 356 via line 360 where it is mixed with ozonated air and water as described. Unlike the embodiment of FIG. 19, when the chemical cartridge is removed or the lid to chemical dispenser 362 is opened, water pump 350 is not de-energized. Rather, breaking the suction from venturi 356 causes biased check valve 388 to immediately close, terminating water flow to chemical dispenser 362. Also, check valve 390 opens and check valve 358 closes due to breaking of the suction, which causes both ports A and B of the venturi to initially evacuate water from the chemical dispenser and line 360. After the water is evacuated, venturi 356 simply draws air in ports A and B through the open chemical dispenser 362 via line 360 while water from air separator 366 is pumped back to the spa via line 368. When the chemical dispenser 362 is sealed after refilling with sanitizer, suction from venturi 356 is again felt in line 360, opening biased check valve 388, check valve 358 and closing check valve 390, again drawing water therethrough and through chemical dispenser 362 to venturi 356. Upon opening of check valve 358, ozone is again drawn from ozone generator 360.

After having thus described my invention and the manner of its use, it is apparent that incidental changes may be made thereto that fairly fall within the scope of the following appended claims, wherein I claim:

1. A spa, hot tub or similar jetted tub comprising:
   a water circulation system integrated in said spa, hot tub or similar jetted tub and further comprising;
   a water pump,
   at least one water inlet communicating with said water pump,
   at least one water outlet configured to provide a jet of water,
   an air intake system coupled to said water circulation system so that air is provided to said jet of water,
   an ozone generator configured to provide at least a low rate of flow of ozonated air at a relatively high concentration to said air intake system and said water circulation system, exposing interior surfaces of said water circulation system and said air intake system to said relatively high concentrations of ozone during periods when said water circulation system and said air intake system is empty of water.

2. A spa, hot tub or similar jetted tub as set forth in claim 1 further comprising retrofitting apparatus including;
   an adjustable air valve on an exterior region of said spa, hot tub or similar jetted tub, said adjustable air valve having a removable portion operable to selectively vary said flow of air,
   an adapter coupled to said ozone generator and configured to replace said removable portion of said air valve so that said ozone may be introduced into said air intake system via said adjustable air valve.

3. A spa, hot tub or similar jetted tub as set forth in claim 2 wherein a flap valve covers each said water outlet and a cover blocks said water inlet.

4. A spa, hot tub or similar jetted tub as set forth in claim 2 wherein said ozone generator is portable, and may be placed in said spa, hot tub or similar jetted tub during use and in an absence of water, and removed when said tub is in use.

5. A spa, hot tub or similar jetted tub as set forth in claim 2 wherein said retrofitting apparatus further comprises;
   a cover blocking said water inlet,
   a blocking device for each said water outlet that generally constrains ozone within said water circulation system,
   tubing from said cover, each said blocking device and said adapter, at least one of said tubing coupled to an output of said ozone generator and remaining said tubing coupled to an intake of said ozone generator so that ozone is provided to said air intake system and said water circulation system only in an absence of water in said spa, hot tub or similar jetted tub.

6. A spa, hot tub or similar jetted tub as set forth in claim 5 wherein each said blocking device comprises a plug.

7. A spa, hot tub or similar jetted tub as set forth in claim 1 further including retrofitting apparatus comprising;
   a cover blocking said water inlet,
   a blocking device for each said water outlet that generally constrains ozone within said water circulation system,
   tubing coupled to said cover and each said blocking device, with at least one of said tubing from some blocking device and said cover coupled to an output of said ozone generator and remaining said tubing coupled to an intake of said ozone generator, so that ozone is circulated through said water circulation system only in an absence of water in said spa, hot tub or similar jetted tub.

8. A spa, hot tub or similar jetted tub as set forth in claim 1 wherein said ozone generator provides a plurality of flow rates of said ozonated air and a plurality of concentrations of ozone in said ozonated air.

9. A spa, hot tub or similar jetted tub as set forth in claim 1 wherein said ozone generator comprises a plasma discharge tube for creating ozone by ionization.

10. A spa, hot tub or similar jetted tub as set forth in claim 9 wherein said corona ozone generator further comprises:
    a tube of non-conducting material,
    an electrode extending longitudinally through said tube and from one end of said tube,
    a conductive winding around said tube,
    a grid positioned at an opposite end of said tube,
    a high tension DC power supply coupled between said winding and said electrode so that a positive potential is applied to said electrode and a negative potential is applied to said winding and a negative potential applied to said grid, whereby
    a corona is developed between said winding and said electrode and ions formed by said corona are drawn toward said grid, producing an airflow through said ozone generator, said air flow coupled to said water circulation system via a venturi device so that when water flows through said water circulation system, a lower concentration of ozone in ozonated air is provided to said water and in an absence of water in said water circulation system said airflow at a higher concentration of ozone in said ozonated air is provided to said water circulation system, exposing interior surfaces of said water circulation system and said air intake system to said higher concentration of ozone.

11. A spa, hot tub or similar jetted tub as set forth in claim 1 wherein said ozone generator comprises a corona ozone generator.

12. A spa, hot tub or similar jetted tub as set forth in claim 1 wherein said ozone generator further comprises at least a plasma discharge tube positioned in a generally vertically oriented housing, said housing being generally open at each end, with an upper end of said housing coupled to said water circulation system, whereby heat from said plasma discharge tube causes air to rise past said plasma discharge tube and exit to said water circulation system in an absence of water in said water circulation system, allowing ozone to pool in said water circulation system and said air intake system.

13. A spa, hot tub or similar jetted tub as set forth in claim 12 wherein said housing is extended at said upper end into a downwardly depending portion so that ozone in said ozonated air falls through said downwardly depending portion to said water circulation system.

14. A spa, hot tub or similar jetted tub comprising:
a water circulation system integrated in said spa, hot tub or similar jetted tub and further comprising;
a water pump,
at least one water inlet communicating with said water pump,
at least one water outlet configured to provide a jet of water,
an air intake system coupled to said water circulation system so that air is provided to said jet of water,
an ozone generator configured to provide a low flow rate of ozonated air at a relatively high concentration of ozone to said water circulation system and said air intake system during periods of time when said water circulation system is empty of water, exposing interior surfaces of said water circulation system and said air intake system to said relatively high concentration of ozone for selected periods of time.

15. A spa, hot tub or similar jetted tub as set forth in claim 16 wherein airflow through said ozone generator is driven by a corona effect to said spa, hot tub or similar jetted tub.

16. A spa, hot tub or similar jetted tub as set forth in claim 14 wherein said ozone generator provides a higher rate of flow at a lower concentration of ozone to said water circulation system when water is flowing therethrough.

17. A spa, hot tub or similar jetted tub as set forth in claim 16 wherein said ozone generator is portable, with removable blocks in openings of said water circulation system being put in place from an exterior of said spa, hot tub or similar jetted tub.

18. A spa, hot tub or similar jetted tub as set forth in claim 16 wherein said ozone generator is permanently retrofittable to said spa, hot tub or similar jetted tub, with removable blocks in openings of said water circulation system being incorporated in said spa, hot tub or similar jetted tub.

19. A spa, hot tub or similar jetted tub as set forth in claim 16 wherein airflow through said ozone generator is driven by convection to said spa, hot tub or similar jetted tub.

20. A spa, hot tub or similar jetted tub as set forth in claim 19 wherein said ozone generator is configured to allow ozone to pool into said water circulation system and said air intake system.

21. A spa, hot tub or similar jetted tub as set forth in claim 16 wherein airflow through said ozone generator is driven by an air pump to said spa, hot tub or similar jetted tub.

22. A spa, hot tub or similar jetted tub as set forth in claim 21 further comprising a venturi coupled to mix ozone into said water circulation system, and wherein said air pump is of a type that limits an amount of air drawn through said ozone generator with water circulating through said water circulation system.

23. A method for providing ozone to a spa, hot tub or similar jetted facility comprising the steps of:
a) removably positioning blocks in openings of a water circulation system of said spa, hot tub or similar jetted facility during periods of an absence of water flow through said water circulation system,
b) providing a first, higher concentration of ozone in a gaseous form to said water circulation system, exposing interior surfaces thereof to gaseous ozone during said periods of an absence of water flow through said water circulation system,
c) providing a second, lower concentration of ozone diffused in water during periods of water flow through said water circulation system, with at least some of said blocks being removed.

24. A method as set forth in claim 23 wherein said step of removably positioning blocks in openings of a water circulation system further comprises the step of placing plugs in jet outlets of said spa, hot tub or similar jetted facility and removing said plugs during said periods of water flow through said water circulation system.

25. A method as set forth in claim 24 wherein said step of removably positioning plugs in said jet outlets further comprises the step of coupling said plugs to said ozone generator.

26. A method as set forth in claim 23 wherein said step of removably positioning blocks in openings of a water circulation system further comprises the step of mounting a flap valve to each jet opening of said spa, hot tub or similar jetted facility.

27. A method as set forth in claim 23 wherein said step of removably positioning blocks in openings of a water circulation system further comprises the step of covering a water inlet of said water circulation system during said periods of an absence of water flow through said water circulation system.

28. A method as set forth in claim 27 further comprising the step of coupling said water inlet to said ozone generator during said periods of an absence of water flow through said water circulation system.

29. A method as set forth in claim 23 further comprising the step of coupling said ozone generator to an air inlet of said water circulation system via an adapter on an exterior of said spa, hot tub or similar jetted facility.

30. A method as set forth in claim 23 wherein said step of providing a first, higher concentration of ozone comprises the step of flowing air at a low flow rate through said ozone generator.

31. A method as set forth in claim 30 further comprising the step of developing said flowing air by use of a corona.

32. A method as set forth in claim 30 further comprising the step of developing said flowing air by use of convection.

33. A method as set forth in claim 30 further comprising the step of developing said flowing air by use of a low-flow air pump.

* * * * *